United States Patent
Kawakami

(10) Patent No.: US 7,606,689 B2
(45) Date of Patent: Oct. 20, 2009

(54) DESIGN SUPPORT SYSTEM, DESIGN SUPPORT METHOD, PROGRAM, AND STORAGE MEDIUM

(75) Inventor: Tatsuro Kawakami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/560,402

(22) Filed: Nov. 16, 2006

(65) Prior Publication Data

US 2007/0083349 A1 Apr. 12, 2007

Related U.S. Application Data

(63) Continuation of application No. 10/782,788, filed on Feb. 23, 2004, now Pat. No. 7,209,872.

(30) Foreign Application Priority Data

Feb. 24, 2003 (JP) .............................. 2003-046225

(51) Int. Cl.
G06F 17/50 (2006.01)
G06G 7/48 (2006.01)
G03G 15/00 (2006.01)
G06G 7/00 (2006.01)

(52) U.S. Cl. ................. 703/7; 703/2; 399/18; 700/214; 700/230

(58) Field of Classification Search ..................... 703/7, 703/2; 399/18; 700/214, 230
See application file for complete search history.

(56) References Cited

U.S. PATENT DOCUMENTS 3,825,251 A * 7/1974 Beery et al. ............. 271/258.03

(Continued)

FOREIGN PATENT DOCUMENTS

JP 11-116133 4/1999

(Continued)

OTHER PUBLICATIONS

Jones et al. "Effect of Hammer Length and Nonlinear Paper-ribbon Characteristics on Impact Printing", 1971.*

(Continued)

*Primary Examiner*—Kamini S Shah
*Assistant Examiner*—Shambhavi Patel
(74) *Attorney, Agent, or Firm*—Fitzpatrick, Cella, Harper & Scinto

(57) ABSTRACT

A design support system is provided, which accurately simulates the behavior of a flexible medium in a convey path even if the flexible medium exhibits different flexural stiffness in different bending directions. In a design support system which supports the user to design a convey path by simulating the behavior of a flexible medium conveyed in the convey path, a flexible medium model creation module (102), when a flexible medium to be conveyed is defined in the convey path defined by using a convey path definition module (101), creates a flexible medium model representing the flexible medium by segmenting the flexible medium into a plurality of stiff body elements each having a mass, and connecting the respective adjacent stiff body elements with two springs, that is, a rotational spring and translational spring whose spring constants change depending on the direction of flexural deformation of the flexible medium. A motion calculation module (104) time-serially calculates the behavioral state of the flexible medium in the convey path by numerical simulation on the basis of the flexible medium model created by a flexible medium model creation module (102) and the convey conditions and frictional coefficients set by a convey condition setting module (103).

12 Claims, 23 Drawing Sheets

U.S. PATENT DOCUMENTS

| | | | | |
|---|---|---|---|---|
| 5,570,280 | A | * | 10/1996 | Nunnally et al. ............... 700/48 |
| 5,838,596 | A | * | 11/1998 | Shimomura et al. ............ 703/6 |
| 6,605,399 | B2 | * | 8/2003 | Chowdry et al. ............... 430/62 |
| 6,712,356 | B2 | * | 3/2004 | Daout et al. ................. 271/250 |
| 6,950,787 | B2 | * | 9/2005 | Hashima et al. ................ 703/2 |
| 2004/0122551 | A1 | * | 6/2004 | Ogawa et al. ............... 700/214 |
| 2005/0197239 | A1 | * | 9/2005 | Bomba et al. .................. 492/7 |
| 2006/0005391 | A1 | * | 1/2006 | Bomba ...................... 29/895.2 |

FOREIGN PATENT DOCUMENTS

JP    11-195052    7/1999

OTHER PUBLICATIONS

Gupta et al. "Modeling a Copier Paper Path: A Case Study in Modeling Transportation Process" 1995.*
Akesson Johannes: "Simulation of Toner Particle Movement in a TonerJet Printer" 1998.*
Kazushi Yoshida "Dynamic Analysis of Sheet Deformation Using Spring-Mass-Beam Model" Articles of The Japan Society of Mechanical Engineers (Series C), vol. 63, No. 615 (Nov. 1997), Article No. 96-1530, pp. 230-236.
Jones et al. "Effect of Hammer Length and Nonlinear paper-ribbon Characteristics on Impact Printing". IBM J. Research & Development, 15, 108. (1971).

* cited by examiner

FIG. 4
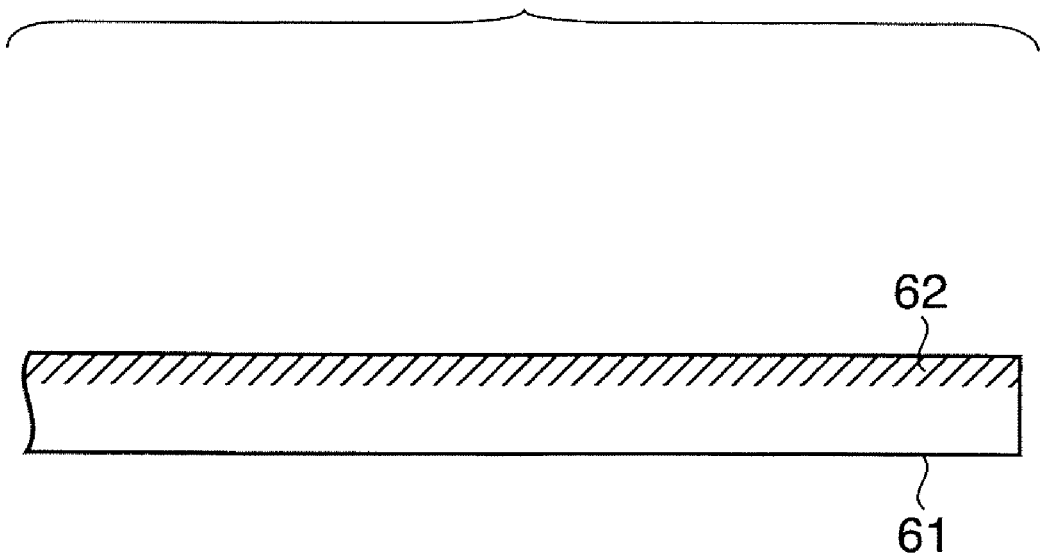
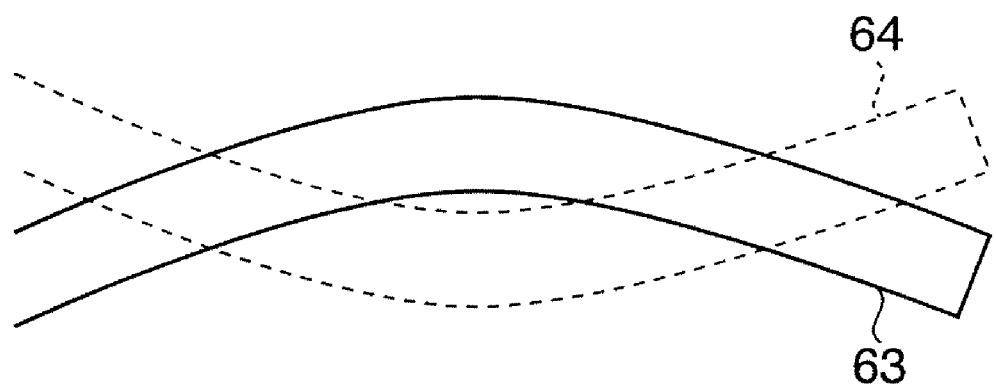

F I G. 12
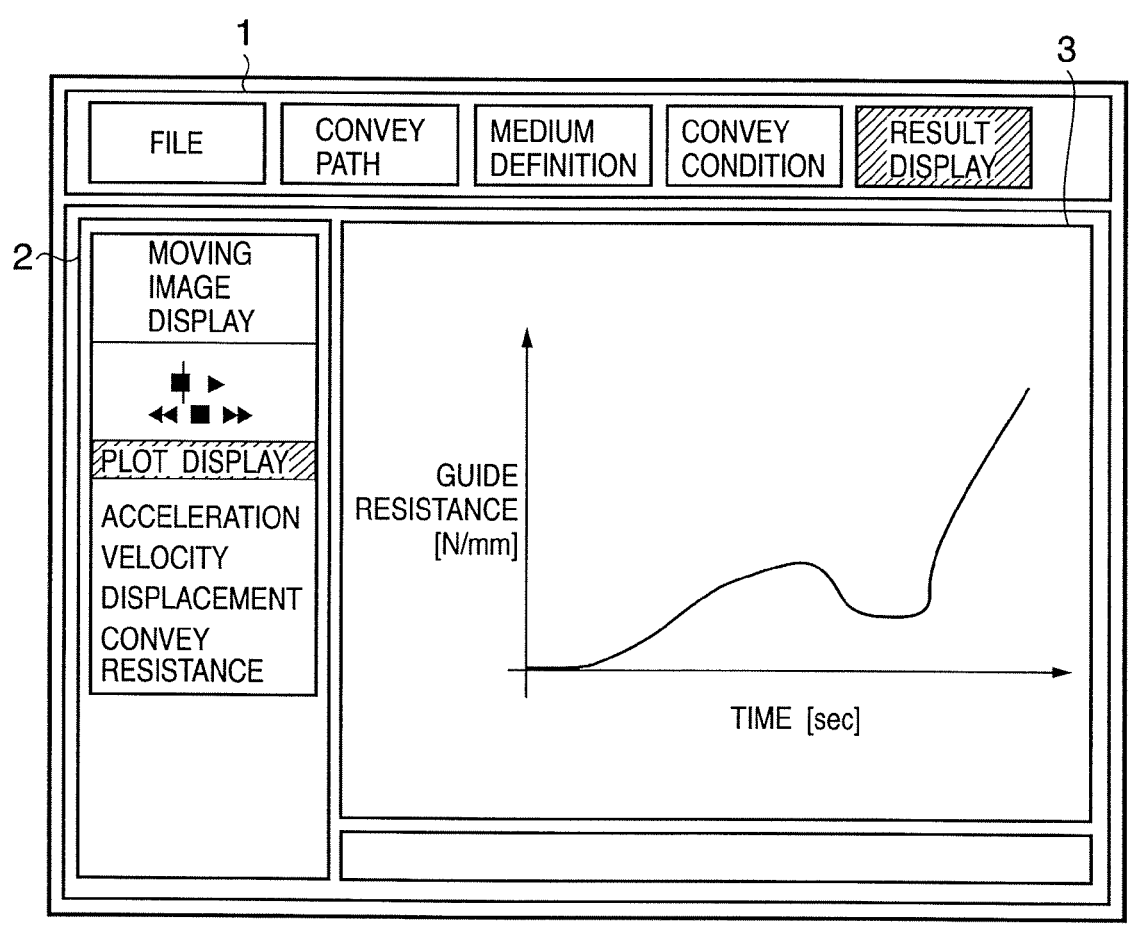

FIG. 19

|  |  | INVERSION MECHANISM | IMAGE FORMING MECHANISM | LEADING END/GUIDE RESISTANCE |
|---|---|---|---|---|
| EN100 | n | 100 | 220 | 60 |
|  | α | 4.0 | 4.8 | 6.0 |
| SPRINGHILL | n | 80 | 180 | 48 |
|  | α | 4.0 | 4.8 | 6.0 |

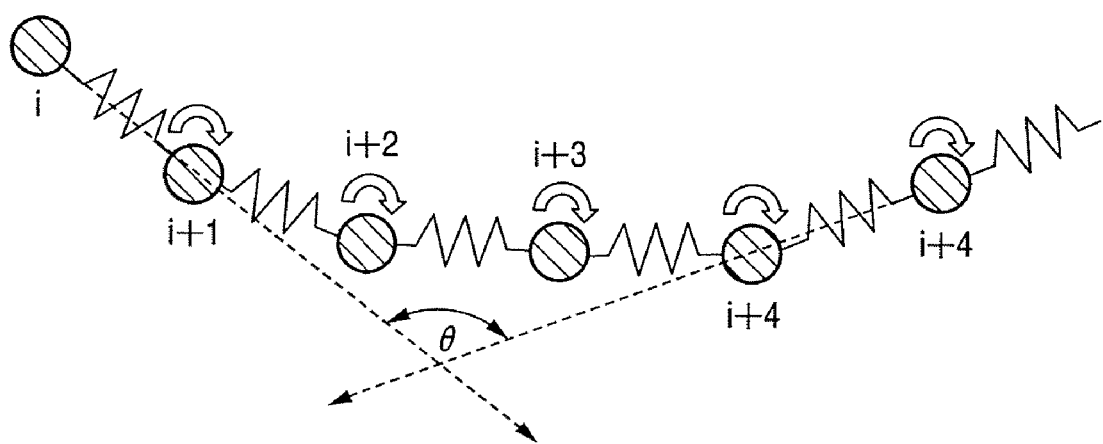
F I G. 21

DESIGN SUPPORT SYSTEM, DESIGN SUPPORT METHOD, PROGRAM, AND STORAGE MEDIUM

This application is a continuation of U.S. patent application Ser. No. 10/782,788, filed Feb. 23, 2004.

FIELD OF THE INVENTION

The present invention relates to the technical field of supporting the design operation of an apparatus having a function of conveying a sheet-like flexible medium such as a recording sheet or film by performing a simulation for the behavioral analysis of the flexible medium conveyed through a convey path by using an information processing apparatus.

BACKGROUND OF THE INVENTION

Conventionally, in the design operations of various kinds of apparatuses, the function of each design target has been studied under various conditions before the actual fabrication of a product by performing various kinds of simulations using an information processing apparatus (to be sometimes referred to as a computer), thereby reducing the number of steps and development period and cost required to manufacture and test a prototype.

As such a design support system, in the field of office equipment and computer peripheral equipment including copying machines, LBPs (Laser Beam Printers), and the like, there has been proposed a technique of simulating the behavior of a sheet-like flexible medium such as a recording sheet or film to be conveyed through a convey path as a design target constituted by mechanical components such as convey guides and convey rollers when the flexible medium is conveyed in the convey path.

A technique of increasing the calculation speed of a computer by simply expressing a flexible medium by masses and linear springs has been proposed in a paper contributed to the Japan Society of Mechanical Engineers. According to this paper, an elastic body representation of the tensile stiffness of the flexible medium is realized by connecting mass points with translational springs with a linear characteristic, and that of the flexural stiffness is realized by connecting mass points with rotational springs with a linear characteristic.

Numerical calculation (numerical analysis) of the motion (behavior) of a flexible medium by an information processing apparatus can be solved by establishing the motion equation of the flexible medium discretely expressed by finite elements or mass-spring systems in the above manner, and in an analysis target time (interval) divided into unit time steps each having a finite width, executing numerical time integration to sequentially obtain unknown accelerations, velocities, and displacements in the respective unit time steps starting from time 0. As such sequences, the Newmark-$\beta$ method, Wilson-$\theta$ method, Euler's method, Kutta-merson method, and the like are widely known.

Assume that a design/analysis support system based on the above conventional analysis technique for a flexible medium convey path is to make analysis for a case wherein a plurality of different kinds of flexible media are conveyed in a convey path as a design target, and a flexible medium whose obverse and reverse surfaces have different stiffness against flexural deformation, for example, coated paper having a coated layer formed on only one surface or plain paper having a toner layer formed on one surface, is conveyed. In this case, since such a flexible medium exhibits different stiffness against flexural deformation (flexural stiffness) in different bending directions, the behavior of the flexible medium cannot be faithfully expressed by simply replacing the flexural stiffness with rotational springs.

In addition, in creating a model of a flexible medium or displaying a calculation result, it is difficult to discriminate which side of the flexible medium is a coated layer or toner layer.

SUMMARY OF THE INVENTION

According to the present invention, a design support system which has a feature of accurately simulating the behavior of a flexible medium in a convey path even if the flexible medium exhibits different flexural stiffness in different bending directions is provided.

In order to realize the above feature, a design support system according to the present invention has the following arrangement.

A design support system which supports a user to design a convey path constituted by mechanical components by simulating a behavior of a flexible medium conveyed in the convey path is provided, comprising:

a flexible medium model creating apparatus which creates a flexible medium model expressing a flexible medium, which is conveyed in a convey path as a design target in which an arrangement of mechanical components of the convey path is defined in advance, by using a plurality of stiff body elements each having a mass and one pair of rotational and translational springs which connect each adjacent pair of stiff body elements; and an input apparatus which inputs information indicating which one of obverse and reverse surfaces of the flexible medium has a coated layer or toner layer formed thereon, wherein the flexible medium model creating apparatus determines a spring coefficient of the rotational spring depending on a bending direction of the flexible medium and the information which is input by the input apparatus and indicates which one of the obverse and reverse surfaces has the coated layer or toner layer formed thereon.

The above feature can also be realized by a design support method corresponding to the design support system having the above arrangement.

In addition, the above feature can be realized by program codes for causing a computer to realize the design support system or method having the above arrangement or a computer-readable storage medium storing the program codes.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a view for explaining a flexural stiffness difference in a flexible medium having different states on its obverse and reverse surfaces;

FIG. 12 is a view showing an example of the window arrangement set when the result display module 105 is executed, and the user selects "plot display" in the first embodiment;

FIG. 19 is a view showing an example of a list of appropriate segmentation counts n and interval ratios $\alpha$ stored in correspondence with the respective types of problem contents in EN100 and Springhill;

FIG. 21 is a view for explaining step S62 in an element re-segmentation module 4B (205);

DETAILED DESCRIPTION OF THE PREFERRED EMBODIMENTS

Preferred embodiments of the present invention will now be described in detail in accordance with the accompanying drawings.

Assume that a design support system according to an embodiment of the present invention is applied to a case wherein in design operation for a convey path included in office equipment and computer peripheral equipment such as a copying machine, LBP, and printer (printing apparatus), the behavior of a sheet-like flexible medium such as a recording sheet or film to be conveyed through a convey path as a design target which is constituted by mechanical components such as convey guides and convey rollers is simulated when the flexible medium is conveyed in the convey path.

First Embodiment

The arrangement of an information processing apparatus as an example of a design support system according to the present invention will be described first with reference to FIG. 23.

Figure 23:
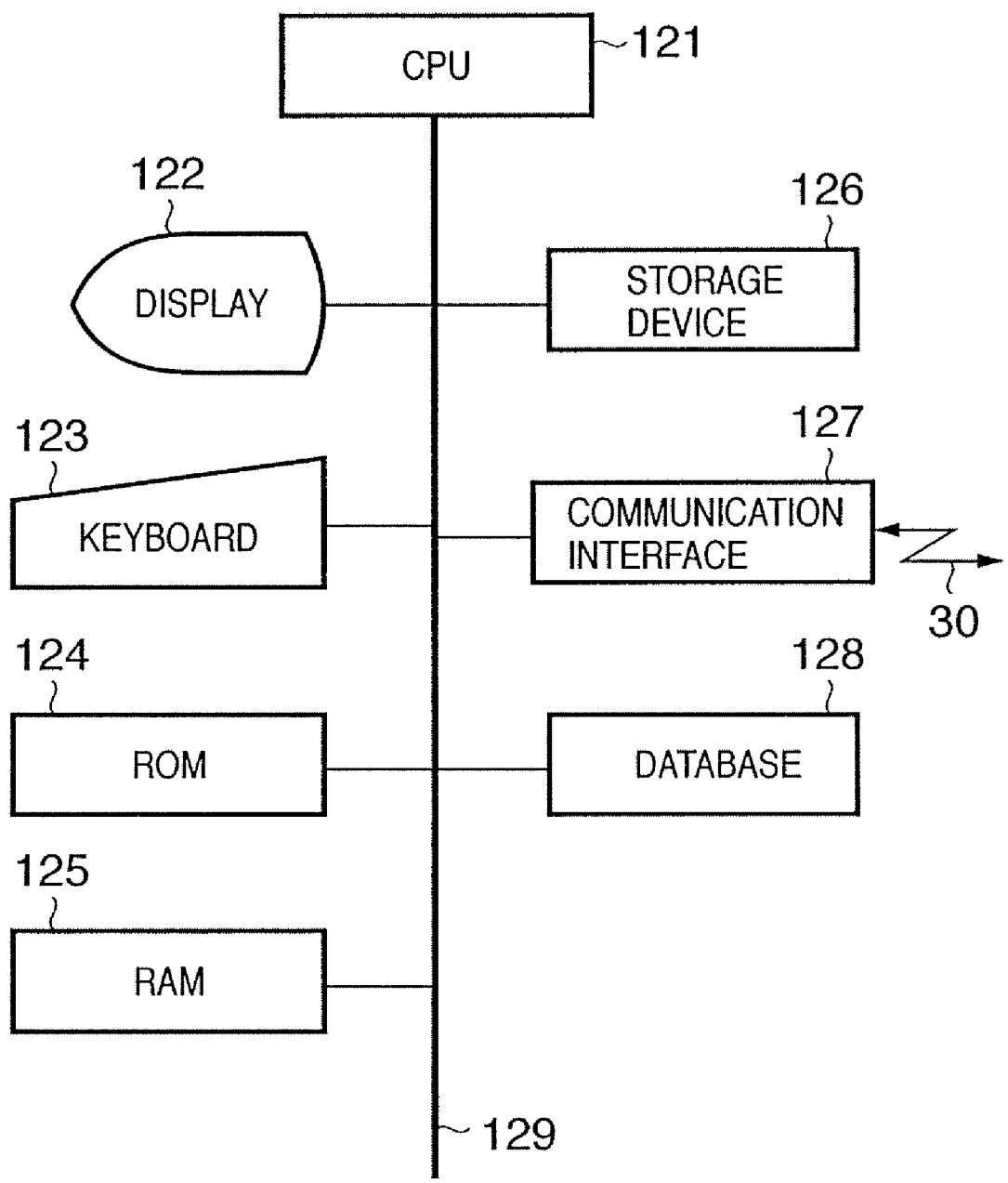
FIG. 23 is a block diagram showing an example of the arrangement of an information processing apparatus to which the present invention can be applied.

Referring to FIG. 23, reference numeral 122 denotes a display such as a CRT or liquid crystal display; 123, a keyboard serving as an input device (including a pointing device such as a mouse); 124, a ROM storing a boot program and the like; 125, a RAM which temporarily stores various processing results; 126, a storage device such as a hard disk drive (HDD) which stores programs for realizing design support processing (FIG. 1) (to be described later) and the like; 127, a communication interface for communication with an external device through a communication line 130; and 128, a database in which pieces of attribute information such as Young's moduli, densities, and thicknesses of flexible media are stored as calculation parameters necessary for the calculation of the motions of the flexible media in a convey path in correspondence with the medium types (paper types), and information for displaying mechanical components constituting a convey path, attribute information of the mechanical components, and the like are also stored. These components are connected to each other through an internal bus 129. A CPU (Central Processing Unit) 121 controls the overall design support system (design support apparatus) in accordance with the programs stored in the storage device 126.

Note that the database 128 may be externally connected to the system through the communication line 30.

Figure 1:
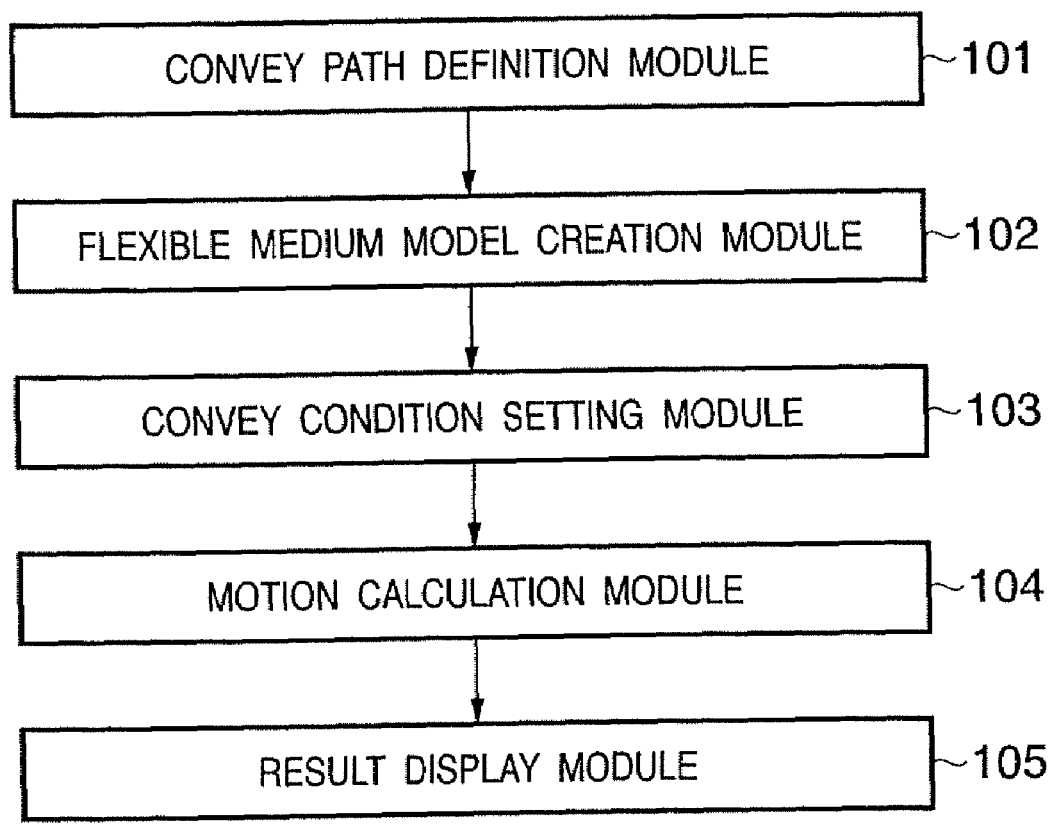
FIG. 1 is a flow chart for explaining the flow of processing in a design support system according to the first embodiment.

FIG. 1 is a flow chart for explaining the flow of processing in the design support system according to the first embodiment. As shown in FIG. 1, the design support system according to this embodiment is constituted by five modules 101 to 105.

This design support system realizes the functions of the respective modules (to be described below) by causing the CPU 121 to execute operation instructions of software programs prepared to support design analysis operation for a convey path by a user. In this case, a module is a predetermined function unit realized by a software program and the hardware arrangement shown in FIG. 23.

Figure 2:
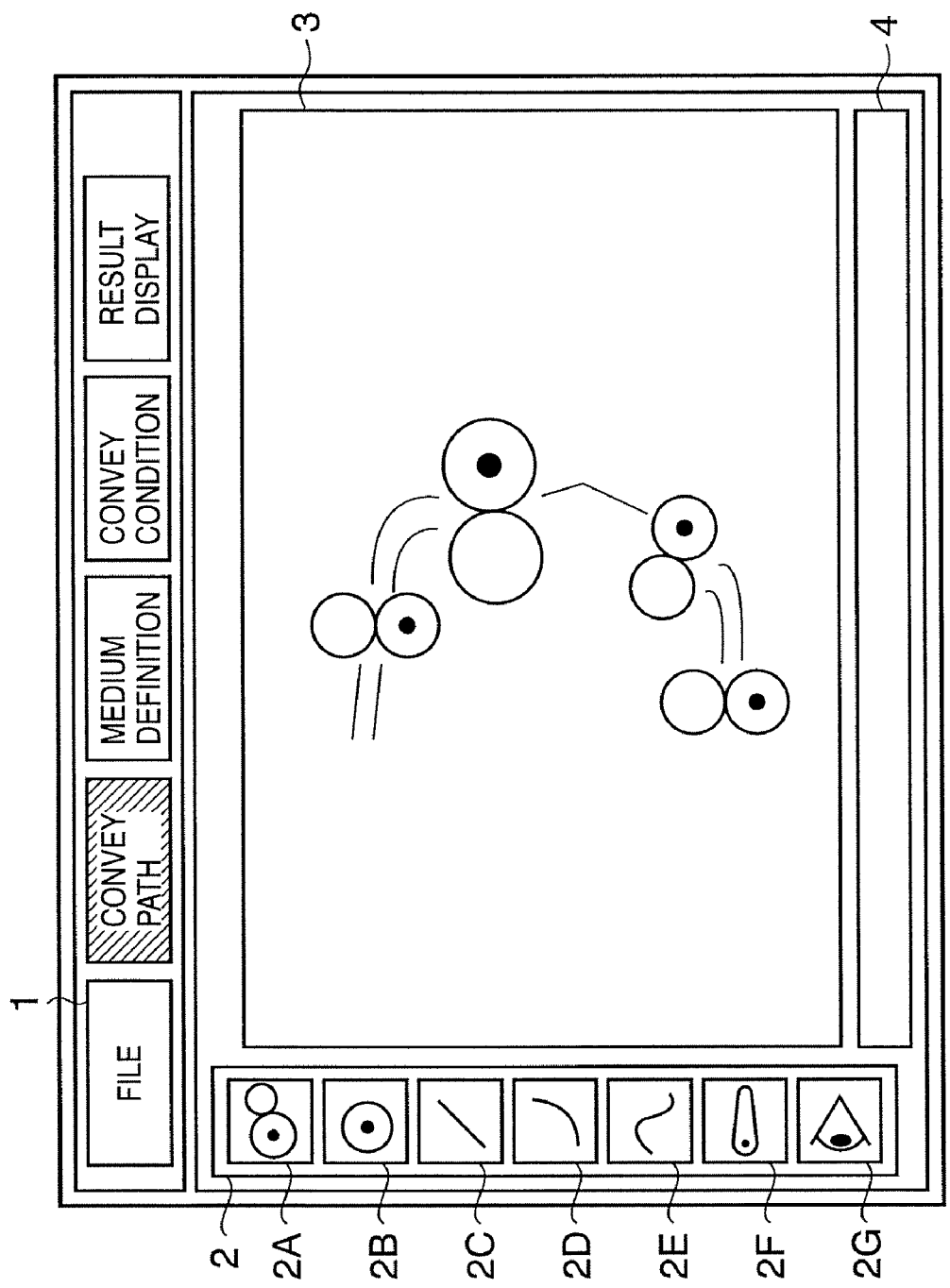
FIG. 2 is a view showing an example of the window arrangement set when a convey path definition module 101 is executed in the design support system according to the first embodiment.

When the execution of this system is started in accordance with predetermined operation by the user, a menu bar 1 shown on an upper portion within the display window in FIG. 2 is displayed on the display 122. The user can activate his/her desired module by selecting the corresponding software button (to be simply referred to as a button hereinafter) displayed in the menu bar 1.

FIG. 2 is a view showing an example of the arrangement of a window in a case wherein the convey path definition module 101 is executed in the design support system according to the first embodiment. This window is roughly constituted by the menu bar 1 for allowing the user to switch the modules to be activated, a sub-configuration menu 2 in which a sub-menu for the activated module is displayed (FIG. 2 shows a case wherein the convey path definition module 101 is selected), a graphical window 3 in which the convey path defined by the user and its analysis result are displayed, and a command field 4 for outputting a system message and allowing the user to input a numerical value as needed.

Each module will be described below in accordance with the flow of processing.

<Convey Path Definition Module 101>

The convey path definition module 101 will be described first. When the user presses the "convey path" button in the menu bar 1 to define a desired convey path on this system, the convey path definition module 101 is activated, and the sub-configuration menu 2 is displayed on the display 122 as shown in FIG. 2.

The sub-configuration menu 2 includes:

a roller pair definition button 2A for defining a pair of convey rollers constituted by two opposing rollers;

a roller definition button 2B for defining one roller alone;

a linear guide definition button 2C for defining a linear convey guide;

an arc guide definition button 2D for defining an arc convey guide;

a spline guide definition button 2E for defining a convey guide by spline curves;

a flapper definition button 2F for defining a flapper (point) for branching the path through which a flexible medium is conveyed; and a sensor definition button 2G for defining a sensor which detects whether or not a flexible medium is located at a predetermined position in a convey path.

As shown in FIG. 2, the symbols of the above buttons 2A to 2G are graphic patterns which allow the user to easily and intuitively understand the functions of the respective buttons. This system has all components required to form a convey path for an actual copying machine or printer. When the user executes definition of each component by predetermined operation using the sub-configuration menu so as to express a convey path as a design target, the shape (symbol) of a component as a definition target desired by the user is displayed at the position designated by the user in the common coordinate system on the graphical window 3.

In this embodiment, in the database, information for simply displaying each symbol on the display 122 is associated with a corresponding one of mechanical components corresponding to the buttons 2A to 2G. In addition, in this database, attribute information is independently associated with each mechanical component. In this embodiment, when each of the buttons 2A to 2G is operated, a sub-menu (not shown) for detailed definition of a corresponding one of the components constituting the convey path is further displayed. The operation necessary for definition in the displayed sub-menu and attribute information stored in the database in advance change for each component.

More specifically, information representing the position and shape of each component and parameter information necessary for other physical calculation are associated as attribute information with information concerning each of the mechanical components corresponding to the buttons 2A to 2G which is stored in the database in advance. As the user places the symbol of a desired component on the display 122, performs operation of adjusting its size, and inputting necessary parameter information in the sub-menu (not shown), information (file) representing a convey path as a design target (analysis target) is defined in the storage device 126. Specific examples of each component and defined attribute information are described below in the order of "button name": "information representing position and shape": "parameter information necessary for other physical calculation".

button 2A (roller pair): radii and center coordinates of two circles as two opposing rollers: roller pressing force, frictional coefficients with flexible medium, rotational speed button 2B (roller): radius and center coordinates of circle as roller: frictional coefficient with flexible medium, rotational speed button 2C (liner guide): start and end point coordinates: frictional coefficient with flexible medium button 2D (arc guide): arc center coordinates, start and end point coordinates of arc: frictional coefficient with flexible medium button 2E (spline): coordinates of feature points constituting spline: frictional coefficient with flexible medium button 2F (flapper): rotation center coordinates and length of flapper: frictional coefficient with flexible medium, drive timing chart representing relationship between time and rotational angle button 2G (sensor): start and end point coordinates of sensor When the user repeats proper operation of each button described above and definition of attribute information as needed, a file formed from an attribute information group corresponding to the convey path shown as an example in the graphical window 3 in FIG. 2 is prepared in the storage device 126.

<Flexible Medium Model Creation Module 102>

Figure 3:
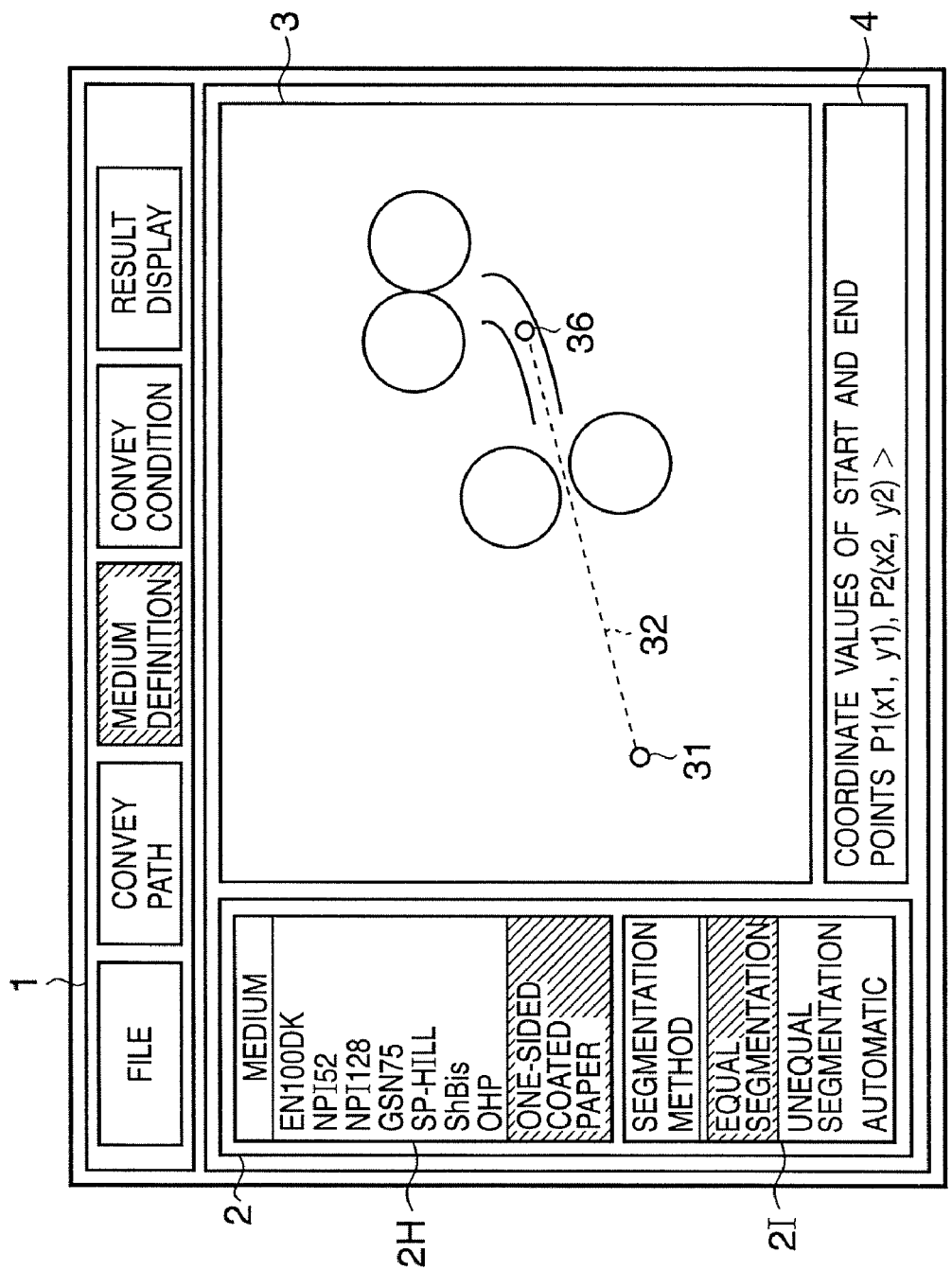
FIG. 3 is a view showing an example of the window arrangement set when a flexible medium model creation module 102 is executed in the design support system according to the first embodiment.

When the user presses the "medium definition" button in the menu bar 1 after completion of definition of a convey path by the convey path definition module 101, the flexible medium model creation module 102 is activated, and the sub-configuration menu 2 for the same module is displayed on the display 122 as shown in FIG. 3.

FIG. 3 is a view showing an example of the window arrangement set when the flexible medium model creation module 102 is executed in the design support system in the first embodiment. Although this window has the same window arrangement as that shown in FIG. 2, a medium type selection window 2H and segmentation method selection window 2I are displayed in the sub-configuration menu 2 in this case. The user can select a medium type and a segmentation method in analysis in accordance with operation on this sub-configuration menu. In the graphical window 3, the user can determine the position of a flexible medium in the convey path, as shown in FIG. 3.

When the flexible medium model creation module 102 is activated, a message prompting the user to input the coordinate values of the two end portions of a flexible medium is displayed in the command field 4 as exemplified by the command field 4 in FIG. 3 to make the user determine the position of the flexible medium in the convey path (the convey path defined in advance by using the convey path definition module 101). At this time, coordinate values are input in the command field 4. Alternatively, coordinate values may be directly designated in the graphical window 3 in accordance with the operation of a pointing device such as a mouse.

When the user inputs the coordinate values of the two end portions of the flexible medium, a start point 31 and end point 36 are automatically displayed at positions corresponding to the input coordinate values of the two end portions in the graphical window 3, as shown in FIG. 3. In addition, a straight line (broken line) 32 connecting these two points is automatically drawn in this window. This allows the user to check how the flexible medium defined by himself/herself is placed in the convey path.

Figure 5:
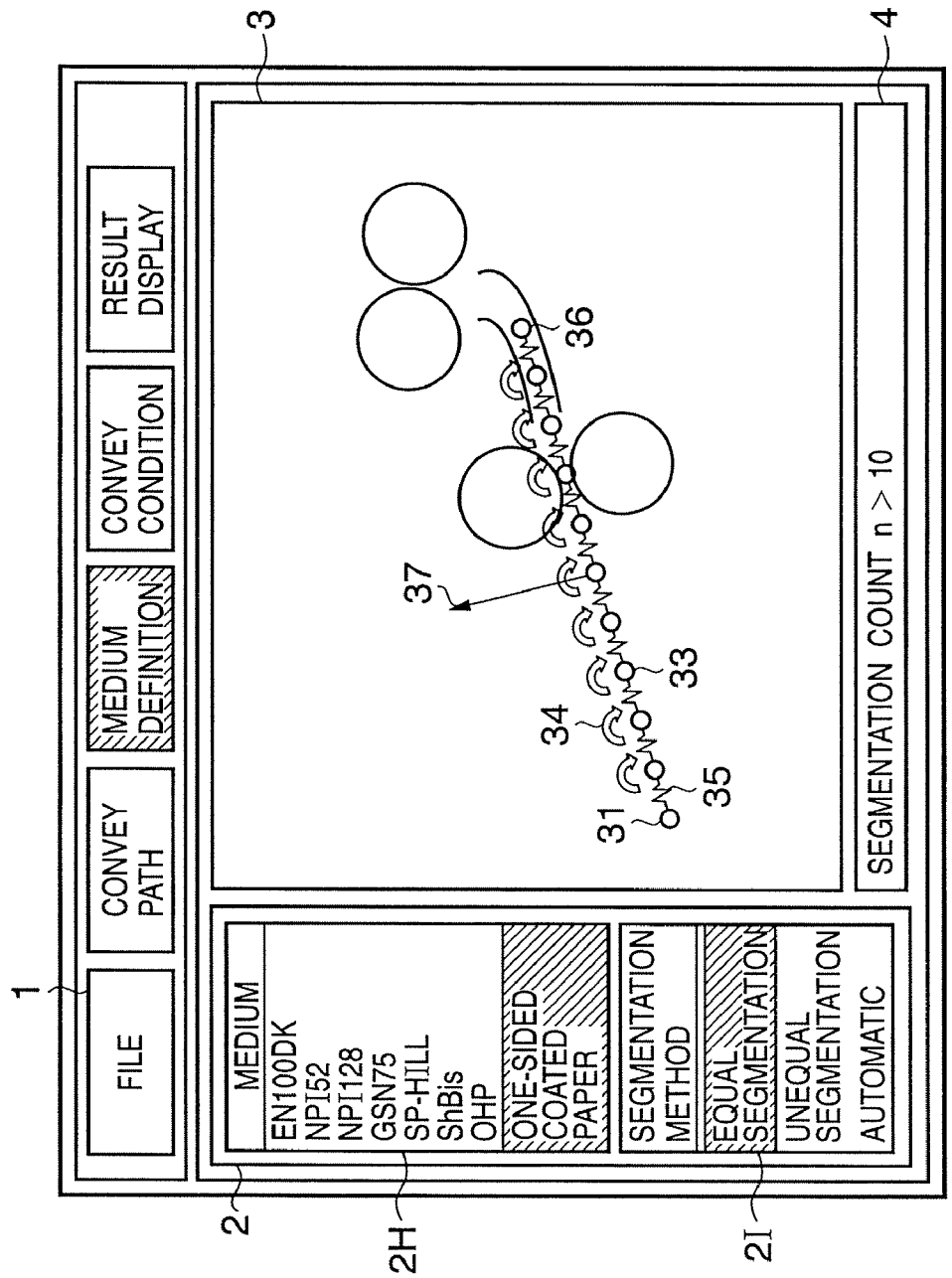
FIG. 5 is a view showing an example of the flexible medium model automatically displayed in a graphical window 3 when the flexible medium model creation module 102 is executed, and the position of the flexible medium, a segmentation count, and a medium type are input in the design support system according to the first embodiment.

Subsequently, a message prompting the user to input a segmentation count n in discretizing the flexible medium expressed by the straight line (broken line) 32 into a plurality of stiff body elements (spring-mass systems) is displayed in the command field 4. The user then inputs the segmentation count n in the command field 4. Referring to FIG. 5, for example, a segmentation count of 10 is input.

When the segmentation n is input, a message prompting the user to perform input operation to select the type of flexible medium expressed by the straight line (broken line) 32 is displayed in the command field 4. The user can select one of the medium types (paper types) displayed in the medium type selection window 2H. FIG. 3 shows, for example, a state wherein "one-sided coated paper" is selected. When the user selects a medium type, the attribute information (the Young's modulus, density, thickness, and the like) of a flexible medium corresponding to the selecting operation is read out from the database 128 (note that an input operation for the segmentation count n and selecting operation for a medium type may be performed in the order reverse to that described above).

A flexible medium which the user tries to analyze its behavior in a convey path may have stiffness against flexural deformation which differs in different directions. That is, this flexible medium may be a flexible medium whose stiffness against flexural deformation (to be referred to as flexural stiffness hereinafter) differs on the obverse side and reverse side like one-sided coated paper having a coating formed on only one side or plain paper having a toner layer formed on only one surface.

In the above case, as shown in FIG. 4, owing the existence of a coated layer 62 which is inhomogeneous in quality in the thickness direction (vertical direction) of a flexible medium 61, the flexible medium 61 exhibits different stiffness against flexural deformation 63 in a convex shape on the coated layer 62 side and flexural deformation 64 in a concave shape. On the other hand, the flexural stiffness of plain paper which is homogeneous in quality in the thickness direction is calculated from the Young's modulus and geometrical moment of inertia obtained by a tensile test.

In this embodiment, in order to calculate the flexural stress of a laminated material such as coated paper, a Gurley stiffness test corresponding to J.TAPPI paper pulp test No. 40-83 was performed, and a flexural Young's modulus was obtained on the basis of the measured Gurley stiffness as follows:

$$E_r = 12\frac{G_r L^2}{wt^3}, E_L = 12\frac{G_L L^2}{wt^3} \quad (1)$$

where $E_r$ is a Young's modulus equivalent to deflection to the right, $E_L$ is a Young's modulus equivalent to deflection to the left, $G_r$ is a Gurley stiffness upon deflection to the right, $G_L$ is a Gurley stiffness upon deflection to the left, L is the length of a test piece, w is the width of the test piece, and t is the thickness of the test piece.

In this case, "equivalent to deflection to the right (left)" is based on a Gurley stiffness test corresponding to J.TAPPI paper pulse test No. 40-83. According to this test, a paper strip is placed upright with its one end being held, and loads are applied to the other end from the left and right to measure its deflection angles, thereby evaluating the stiffness of the paper. A paper sheet having a coating formed on only one surface exhibits different flexural stiffnesses on the obverse and reverse surfaces, and the left and right deflection angles are detected in the Gurley test.

In this embodiment, in the medium type selection window 2H, the user selects representative one-sided coated paper (density: $7.6 \times 10^{-7}$ kg/mm$^3$, thickness: 0.129 mm) among selectable flexible medium types, and the flexural Young's moduli of a test piece of the one-sided coated paper which has a size of 12.7 mm (width w)×37.5 mm (length L) are given as Er=5204 Mpa and EL=6321 Mpa where Er is the Young's modulus equivalent to flexural deformation in a concave shape on the coated layer side, and EL is the Young's modulus equivalent to flexural deformation in a convex shape on the coated layer side. When the user selects the "one-sided coated paper" button in the medium type selection window 2H in which the sub-configuration menu 2 shown in FIG. 3 is displayed, the physical values (attribute information) of the above Young's moduli, density, and thickness are read out from the database 128.

FIG. 5 shows an example of a flexible medium model automatically displayed in the graphical window 3 when the flexible medium model creation module 102 is executed and the position of a flexible medium, a segmentation count, and a medium type are input in the design support system according to the first embodiment.

When the "equal segmentation" button in the segmentation method selection window 2I is selected, a model is displayed in the graphical window 3 as shown in FIG. 5, which is obtained by arranging mass points 33 at the respective positions where the straight line (broken line) 32 in FIG. 3 is segmented at equal intervals into 10 parts in the graphical window 3, and connecting the respective mass points 33 with rotational springs 34 and translational springs 35 (for the sake of descriptive convenience, a case wherein the "unequal segmentation" button is operated and a case wherein the "automatic" button is operated will be described in the second embodiment).

Each rotational spring 34 connecting the mass points 33 represents flexural stiffness when a flexible medium is regarded as an elastic body, whereas each translational spring 35 represents tensile stiffness. The spring constants of the rotational spring 34 and translational spring 35 can be derived from the elastic theory. More specifically, rotational spring constants kr and kL and a translational spring constant ks can be given by $$k_r = \frac{E_r w t^3}{12\Delta L}, k_L = \frac{E_L w t^3}{12\Delta L} \quad (2)$$

$$ks = \frac{Ewt}{\Delta L}, \Delta L = \frac{\sqrt{(x_2 - x_1)^2 + (y_2 - y_1)^2}}{n}$$

where E is a Young's modulus, w is a width, t is a thickness, and ΔL is the distance between mass points.

A mass m at each mass point 33 is calculated by m=Lwtρ/(n−1) where L is the length of the flexible medium, w is the width, t is the thickness, ρ is the density, and n is a segmentation count.

In this embodiment, when a flexible medium model is displayed in the graphical window 3 as shown in FIG. 5, an arrow 37 is displayed in a direction perpendicular to the intermediate point of a vector connecting the start point 31 and end point 36 as shown in FIG. 5 to allow the user to easily discriminate between the obverse and reverse surfaces of the flexible medium. In defining the obverse and reverse surfaces of a flexible medium in this system, when, for example, the user inputs the coordinate values of the two end portions (the start point 31 and end point 36 in the case shown in FIG. 3) of the flexible medium to determine the position of the flexible medium in the above convey path, and also selects a desired side of the flexible medium as an obverse surface in the window with a pointing device or the like, the selected coordinate value is stored. In displaying the graphical window 3 shown in FIG. 5, on the basis of the coordinate values of the three points, that is, the stored coordinate value and those of the start point 31 and end point 36, the arrow 37 may be displayed, which extends in a direction perpendicular to the intermediate point of the vector connecting the start point 31 and the end point 36 and also extends into one of the two areas separated by the straight line connecting the start point 31 and the end point 36 in which the selected coordinate value is contained.

According to the above sequence, a flexible medium to be conveyed on a convey path can be discretized into spring-mass elements and defined, on this system, as a model of an elastic body (flexible medium model) that reacts to "flexural" and "tensile" forces.

<Convey Condition Setting Module 103>

After discretization into the spring-mass elements by the flexible medium model creation module 102, the flow advances to the processing executed by the convey condition setting module 103. The convey condition setting module 103 defines drive conditions for convey rollers constituting the convey path defined in advance by using the convey path definition module 101, control on a flapper for branching the convey path, and frictional coefficients between the flexible medium and the convey guides and rollers when they come into contact.

Figure 6:
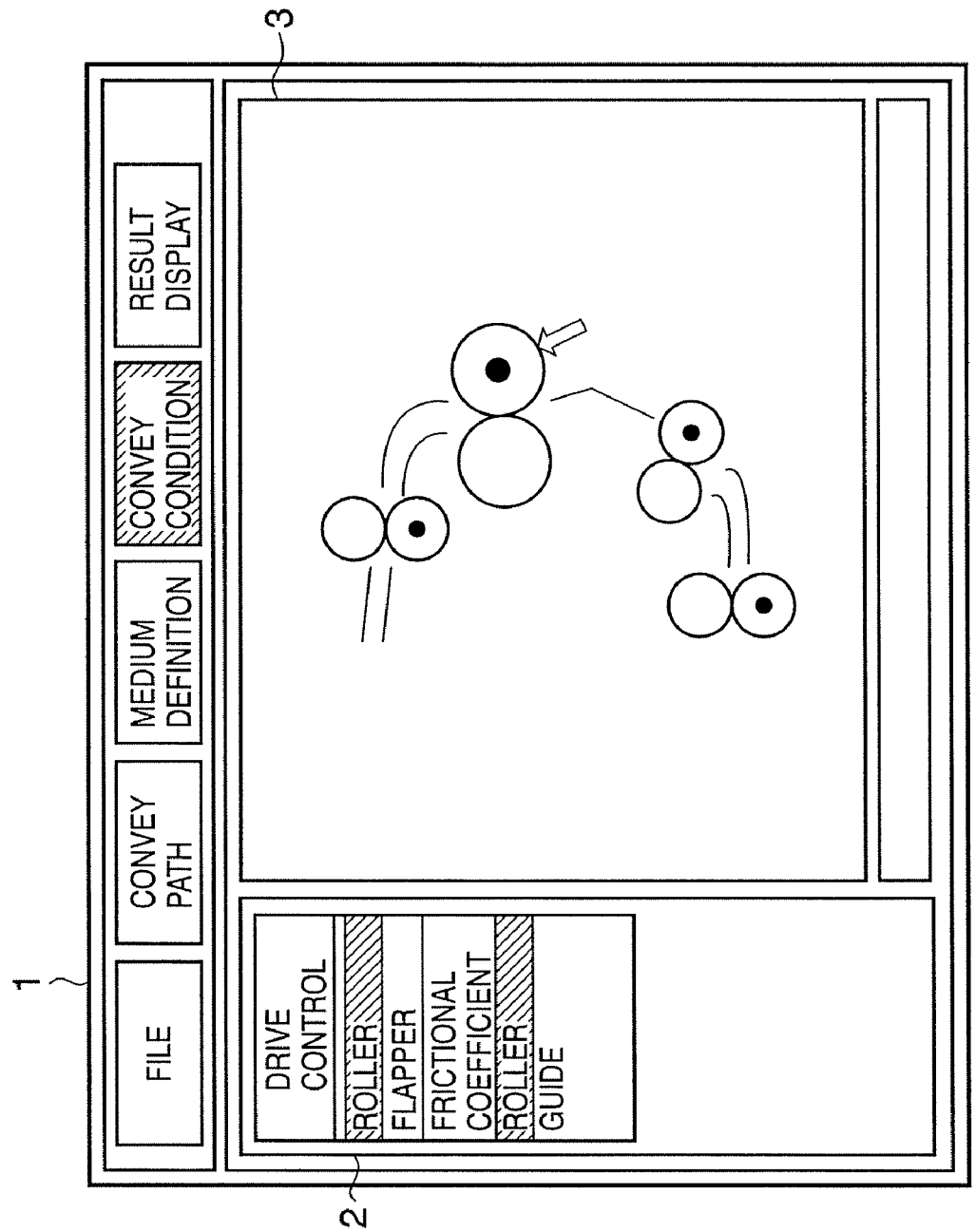
FIG. 6 is a view showing an example of the window arrangement set when a convey condition setting module 103 is executed in the design support system according to the first embodiment.

FIG. 6 is a view showing an example of the window arrangement set when the convey condition setting module 103 is executed in the design support system according to the first embodiment. This processing is executed when the user presses the "convey condition" button in the menu bar 1, and at the same time, choices for the definition of drive conditions (drive control definition) and frictional coefficients are displayed in the sub-configuration menu 2.

FIG. 6 shows an example of input operation for drive control on the rollers. Upon selecting driving condition "roller" in the sub-configuration menu 2, the user selects, with a pointing device or the like, one of the convey rollers constituting the convey path, displayed in the graphical window 3, for which the user wants to define drive conditions.

Figure 7:
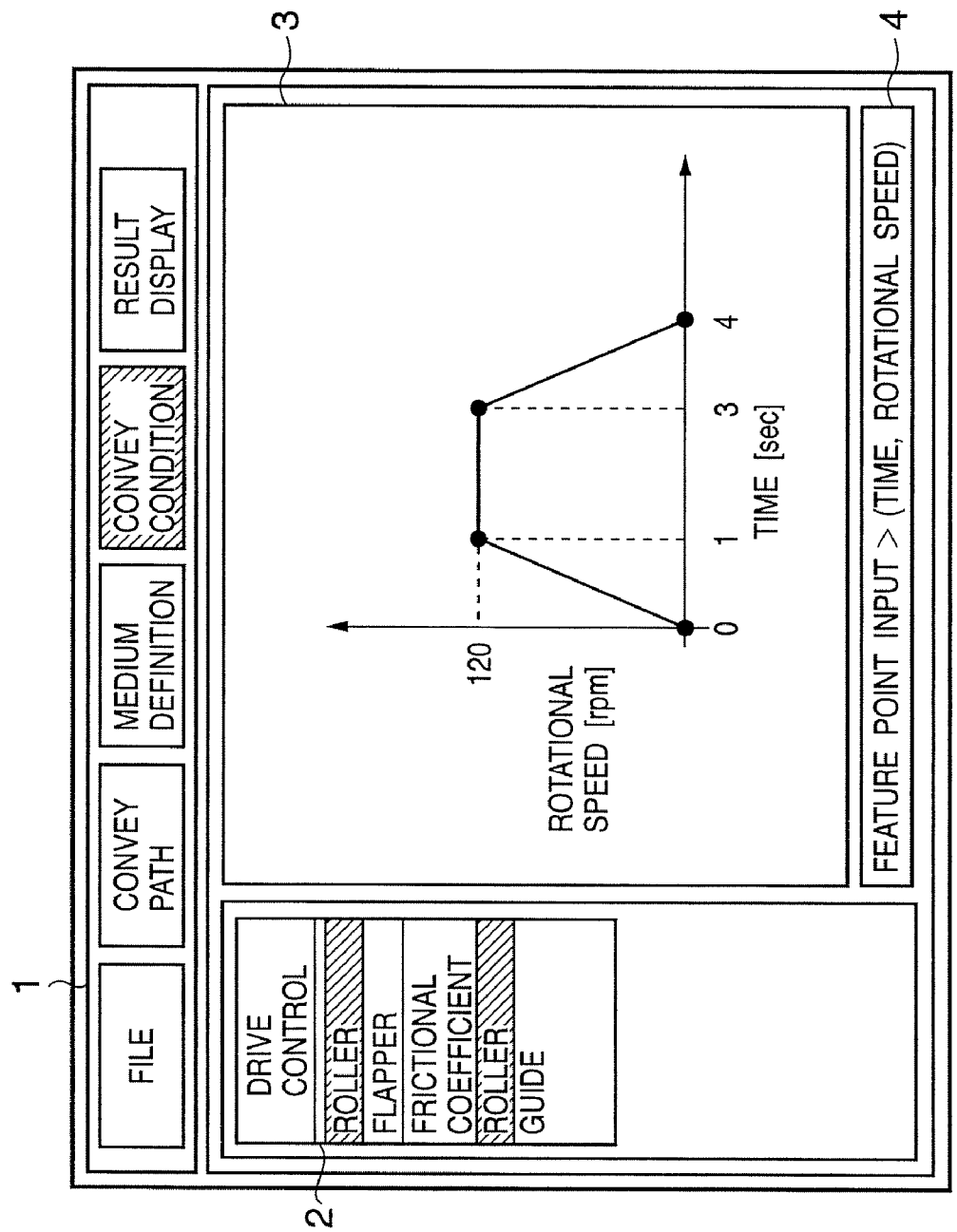
FIG. 7 is a view showing an example of the display window to be displayed when drive control on a roller is to be defined upon execution of the convey condition setting module 103 in the first embodiment.

After the selection of a roller (indicated by the arrow in FIG. 6), a graph indicating the rotational speed of the roller as a function of time is displayed in the graphical window 3, as shown in FIG. 7.

FIG. 7 is a view showing an example of the display window displayed when the convey condition setting module 103 is executed and drive control on the rollers is to be defined in the first embodiment.

In defining drive control on a roller, when the user inputs feature points each formed from (time, rotational speed) in the command field 4, a graph like the one shown in FIG. 7 is automatically created in the graphical window 3 on the basis of the value of each input feature point (time, rotational speed).

In the case shown in FIG. 7, in accordance with (0, 0), (1, 120), (3, 120), and (4, 0) input as feature points by the user, the rotational speed of the roller is linearly increased from 0 to 120 rpm in the interval from 0 to 1 sec, maintained at 120 rpm in the interval from 1 to 3 sec, and decreased from 120 to 0 sec in the interval from 3 to 4 sec.

Although the above input sequence and display form are directed to control definition for a roller, they are the same for control definition for a flapper used for a branch path except that the ordinate represents the angle instead of the rotational speed.

Figure 8:
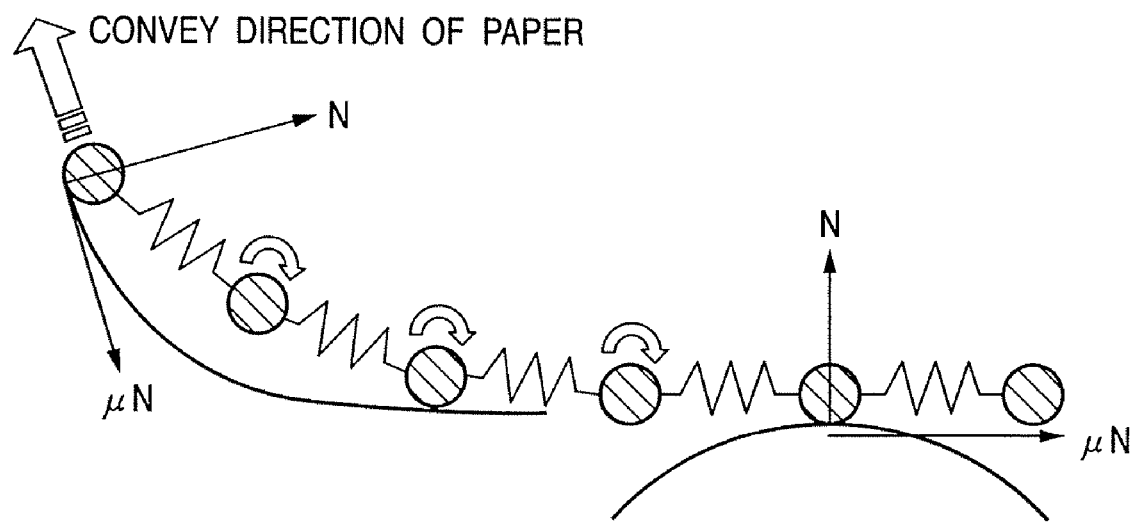
FIG. 8 is a view for explaining a normal force N obtained by contact calculation between a mass point of a flexible medium and a roller or guide and a frictional force $\mu N$ in a direction opposite to the convey direction of paper.

In defining a frictional coefficient, after selecting drive condition "frictional coefficient" in the sub-configuration menu 2, the user selects each roller or guide displayed in the graphical window 3 and inputs a frictional coefficient μ with the paper in the command field 4. In this case, letting N be the normal force obtained by contact calculation between a mass point of the flexible medium and the roller or guide, setting is made in accordance with the input frictional coefficient μ such that a frictional force μN acts in a direction opposite to the convey direction of the paper as shown in FIG. 8.

<Motion Calculation Module 104>

After the processing by the convey condition setting module 103, the flow advances to the processing by the motion calculation module 104. The motion calculation module 104 obtains the behavior of the flexible medium conveyed in the convey path by solving the equation of motion in consideration of various kinds of forces acting on the flexible medium model created by the flexible medium model creation module 102.

Figure 9:
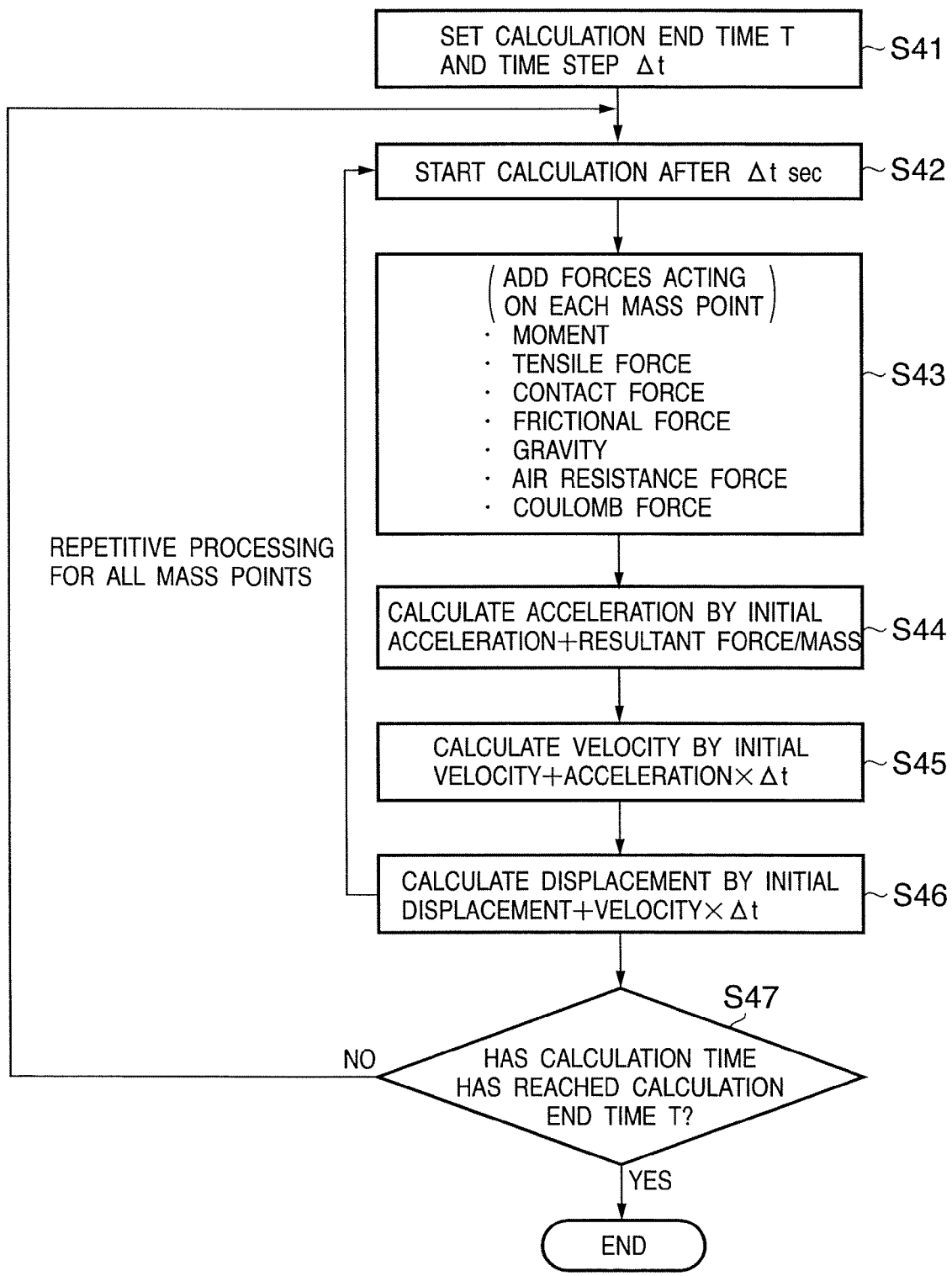
FIG. 9 is a flow chart showing the details of a motion calculation module 104.

FIG. 9 is a flow chart showing the details of the motion calculation module 104.

First of all, in step S41, the motion calculation module 104 sets a real time T for the calculation of the motion of the flexible medium and a time step Δt of numerical time integration used when the equation of motion is numerically solved.

Steps S42 to S47 correspond to a loop for numerical time integration. The motion of the flexible medium is calculated every Δt from the initial time, and each result is stored in the storage device 126.

In step S42, an initial acceleration, initial velocity, and initial displacement necessary for calculation after Δt sec are set by the user.

In step S43, a force acting at each mass point forming the flexible medium is defined. A plurality of kinds of forces act at each mass point, including a rotation moment, tensile force, contact force, frictional force, gravity, air resistance force, and coulomb force. These plurality of kinds of forces acting at each mass point are calculated, and the resultant force of them is calculated. The calculated resultant force is finally defined as a force acting on the flexible medium.

The manner of handling a rotation moment acting on the above flexible medium will be described below with reference to FIG. 10.

Figure 10:
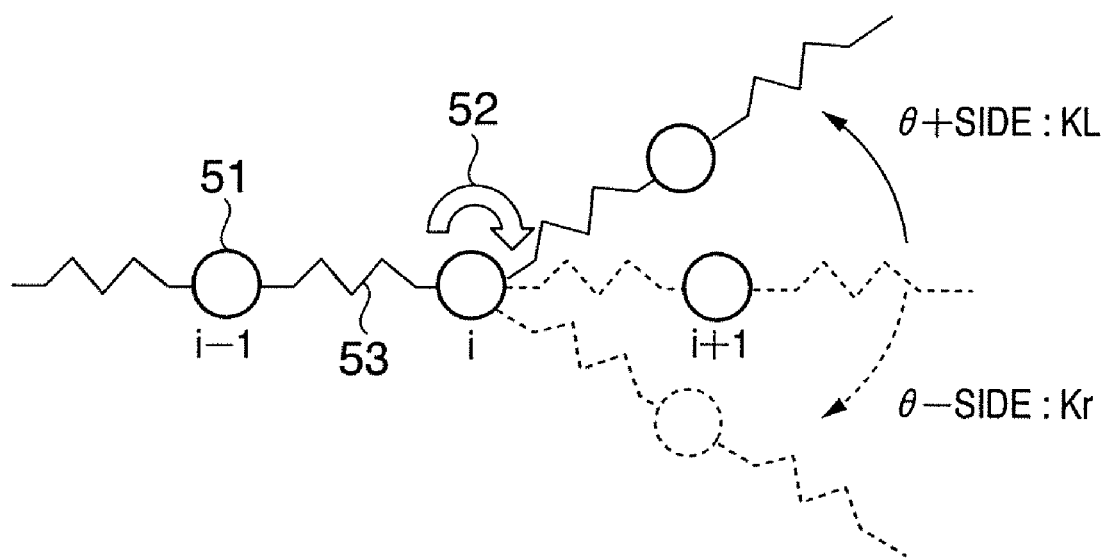
FIG. 10 is a view for explaining how to handle rotational moments acting on a flexible medium.

FIG. 10 is a view for explaining how to handle a rotation moment acting on a flexible medium. As described above, the flexible medium is expressed as an elastic body model by the flexible medium model creation module 102 by connecting mass points 51 with rotational springs 52 and translational springs 53. Assume that a coated layer or toner layer is formed on the upper surface side of the flexible medium model shown in FIG. 10. In this case, if the angle defined by a vector connecting a mass point (i−1) and a mass point i and a vector connecting the mass point i and a mass point (i+1) is larger than 0 (if the side on which the coated layer or toner layer is formed is bent toward the valley side), kL is used as a rotational spring constant. If this angle is smaller than 0 (if the side on which the coated layer or toner layer is formed is bent toward the peak side), kr is used as a rotational spring constant.

With regard to the relationship in magnitude between the two spring constants kL and kr, when a coated layer or toner layer is formed on one surface of a flexible medium, the rotation moment differs on the obverse and reverse surfaces. For this reason, these spring constants are selectively used depending on the bending direction. Consider, for example, a coated layer or toner layer. If a coated layer or toner layer is formed on the upper surface side in FIG. 10, kL<kr generally holds.

In step S44, an acceleration after Δt sec is calculated by dividing the force acing at the mass point obtained in step S43 by the mass of the mass point and adding the initial acceleration to the quotient. Likewise, a velocity is calculated in step S45, and a displacement is calculated in step S46.

In this method, Euler time integration method is used for a series of calculations of physical quantities after Δt sec in steps S43 to S45. However, other time integration methods such as the Kutta-merson method, Newmark-β method, and Wilson-θ method may be used.

Step S46 checks whether or not the calculation time has reached the real time T set in step S41. If YES in step S46, the motion calculation module 104 is terminated. If NO in step S46, the flow returns to step S42 to repeat the above time integration.

<Result Display Module 105>

When the user presses the "result display" button in the menu bar 1, the result display module 105 is activated.

Figure 11:
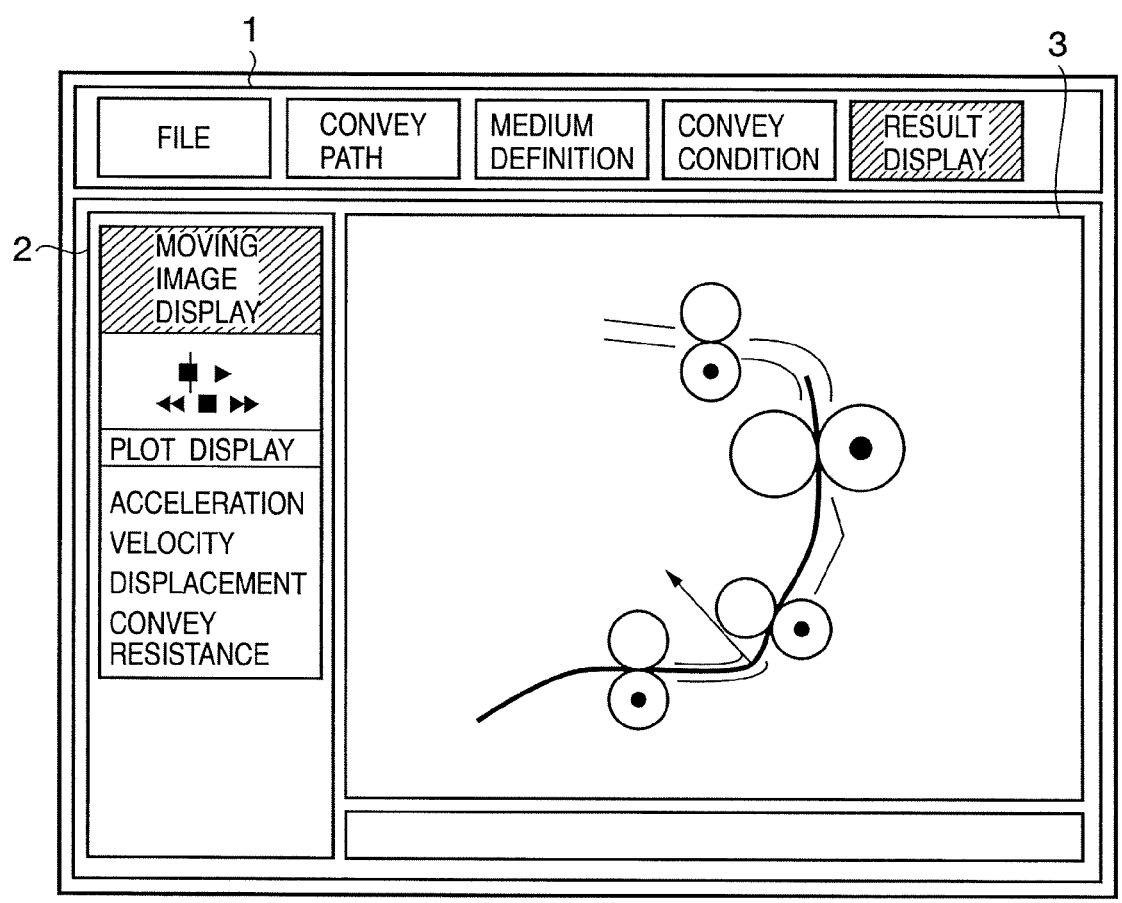
FIG. 11 is a view showing an example of the window arrangement set when a result display module 105 is executed, and the user selects "moving image display" in the first embodiment.

FIG. 11 is a view showing an example of the window arrangement set when the result display module 105 is executed, and the user selects "moving image display" in the first embodiment. In the sub-configuration menu 2, a "moving image display" menu and "plot display" menu are mainly displayed. FIG. 11 shows an example of the image displayed in the graphical window 3 when "moving image display" is selected.

The "moving image display" menu is constituted by a playback button, stop button, pause button, fast forward button, and rewind button. As the user operates these buttons, the behavior of the flexible medium is automatically visualized in the graphical window 3. In this case as well, in order to allow the user to discriminate between the obverse and reverse surface of the flexible medium, an arrow may be displayed on the same side as that of the arrow 37 in FIG. 5, as shown in FIG. 11 (or the obverse and reverse surfaces may be displayed in different colors).

FIG. 12 is a view showing an example of the window arrangement set when the result display module 105 is executed, and the user selects "plot display" in the first embodiment. In the sub-configuration menu 2, the "moving image display" menu and "plot display" menu are mainly displayed. FIG. 12 shows an example of the image displayed in the graphical window 3 when "plot display" is selected.

In "plot display", in order to display the behavior of the flexible medium more quantitatively, the convey load on the guide or roller of interest (analysis target) selected by the user, the acceleration, velocity, and displacement of the flexible medium, and the like are displayed as a function of time in the form of a graph. In this manner, the result display module 105 makes it possible to make various kinds of evaluations in the convey path.

As described above, according this embodiment, there is provided the design support system which supports a user to design a convey path constituted by mechanical components by simulating the behavior of a flexible medium conveyed in the convey path includes the convey path definition module 101 which allows the user to define the arrangement of mechanical components in a convey path as a design target, the flexible medium model creation module 102 which, when a flexible medium to be conveyed is defined in the convey path defined by using the convey path definition module 101, creates a flexible medium model representing the flexible medium by segmenting the flexible medium into a plurality of stiff body elements each having a mass, and connecting the respective adjacent stiff body elements with two springs, that is, a rotational spring and translational spring whose spring constants change depending on the direction of flexural deformation of the flexible medium, the convey condition setting module 103 which allows the user to set convey conditions in the convey path and frictional coefficients between the flexible medium and the mechanical components arranged on the convey path, the motion calculation module 104 which time-serially calculates the behavioral state of the flexible medium in the convey path by numerical simulation on the basis of the flexible medium model created by the flexible medium model creation module 102 and the convey conditions and frictional coefficients set by the convey condition setting module 103, and the result display module 105 which displays the behavioral state of the flexible medium which is calculated by the motion calculation module 104.

This makes it possible to accurately simulate the phenomenon in which the stiffness of a flexible medium, such as, coated paper having a coated layer formed on only one surface or plain paper having a toner layer formed on only one surface, against flexural deformation differs in different bending directions. That is, this embodiment provides excellent convenience.

In addition, according to this embodiment, when the flexible medium model created by the flexible medium model creation module 102 is displayed, a marker (symbol) which allows the user to easily discriminate between the obverse and reverse surfaces of the flexible medium model, like the arrow 37 shown in FIG. 5, is displayed. When, therefore, flexible medium model creation and calculation results are displayed, the user can clearly discriminate which side is a coated layer or toner layer. This makes it possible to prevent errors in the creation of a model and easily evaluate calculation results.

Furthermore, in this embodiment, as the coordinate values of the two points of the end portions of the flexible medium and a segmentation count between the two points are input, the flexible medium model creation module 102 segments the flexible medium into a plurality of stiff body elements at equal intervals between the two points. This can easily realize discretization of the flexible medium into a plurality of stiff body elements (spring-mass systems), and hence can greatly reduce the number of steps required for the creation of a model.

Second Embodiment

The second embodiment based on the design support system of the first embodiment described above will be described next. In the following description, redundant descriptions of arrangements similar to those in the first embodiment will be omitted, and the characteristic portions of the second embodiment will be mainly described.

A problem in the design support system using discretization described in "BACKGROUND OF THE INVENTION" is that as discretization size of a flexible medium is increased (i.e., a flexible medium is discretized into smaller elements), the calculation precision improves, whereas the calculation time increases. That is, there is a tradeoff relationship between the calculation precision and the calculation time.

In evaluating the design of a convey path through which a flexible medium is conveyed, it is required to accurately estimate contact angles and convey resistances between the end portions of the flexible medium, guides, rollers, and the like. When an end portion of a flexible medium comes into contact with a guide, roller, or the like, a satisfactory flexural deformation state cannot be expressed with coarse discretization. That is, the calculated contact angle becomes smaller than the actual angle. This leads to determination of a too small convey resistance. In general, the designer who has designed the internal arrangement of the design support system knows the existence of such a drawback in a numerical simulation result. However, it is not easy for a simple user of this design support system to properly evaluate the inherent drawback. The user cannot therefore determine a proper discretization level for a flexible medium.

It is therefore the main object of this embodiment to determine a proper discretization level on the basis of the design support system described in the first embodiment so as to solve the above problem.

Figure 13:
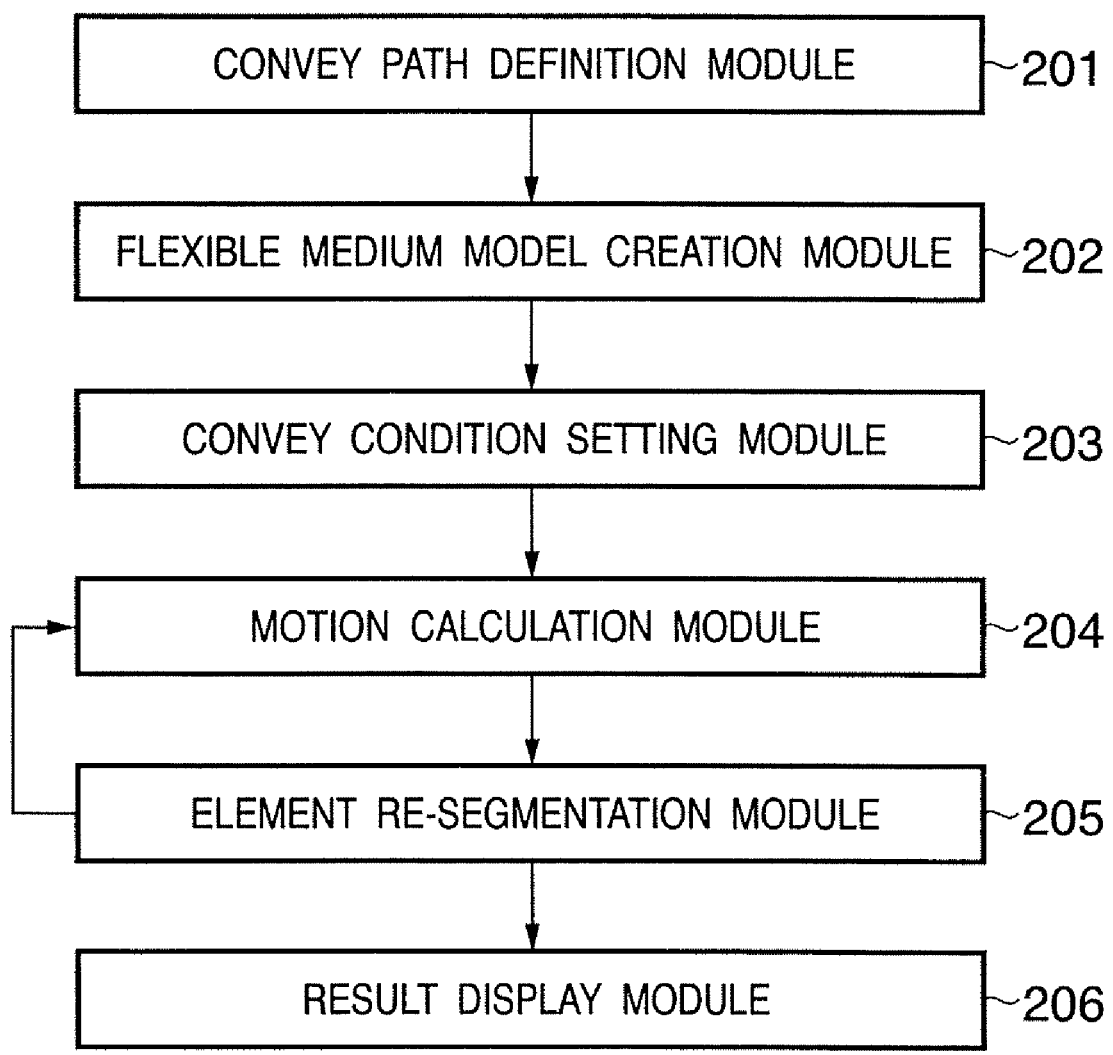
FIG. 13 is a flow chart for explaining the flow of processing in a design support system according the second embodiment.

FIG. 13 is a flow chart for explaining the flow of processing in the design support system according to the second embodiment. The design support system according to this embodiment is comprised of six modules 201 to 206, as shown in FIG. 13.

The respective modules will be described below in accordance with the flow of processing.

<Convey Path Definition Module 201>

The convey path definition module 201 has substantially the same processing arrangement as that of the convey path definition module 101 according to the first embodiment. The user can define a convey path as shown in a graphical window 3 by operating buttons in a sub-configuration menu 2 shown in FIG. 2 and the like.

<Flexible Medium Model Creation Module 202>

When the user presses the "medium definition" button in a menu bar 1 after the completion of definition of the convey path by the convey path definition module 201, the flexible medium model creation module 202 is activated. The user can define a flexible medium as shown in the graphical window 3 by operating buttons in the sub-configuration menu 2 shown in FIG. 14 and the like. In addition, a flexible medium model of the defined flexible medium can be created.

Figure 14:
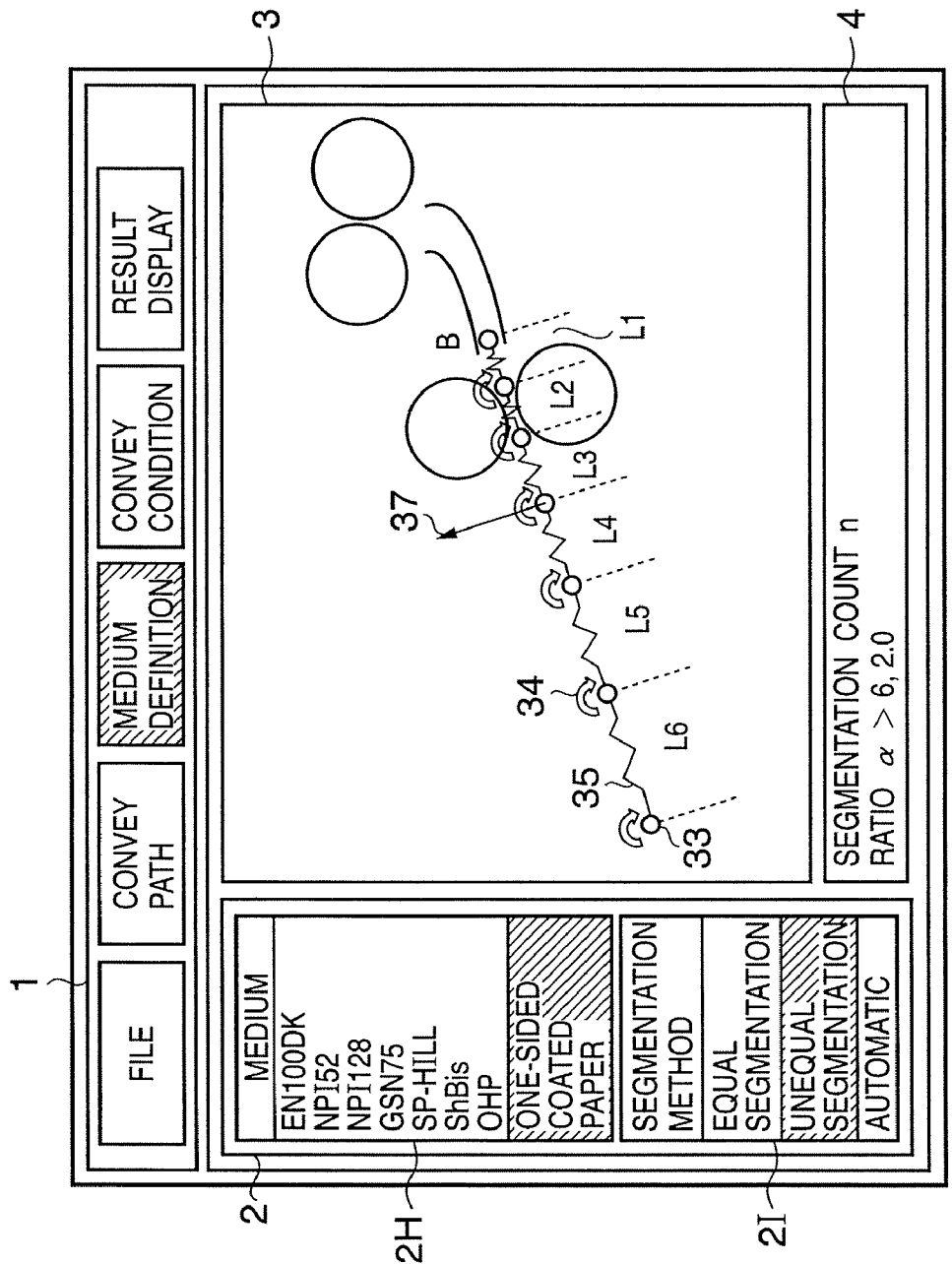
FIG. 14 is a view showing an example of the flexible medium model automatically displayed in a graphical window 3 when a flexible medium model creation module 202 is executed, the position of a flexible medium, a segmentation count, and a medium type are input, and the "unequal segmentation" button is operated in the design support system according to the second embodiment.

Assume that when the user selects the "EN100D" button in a medium type selection window 2H displayed in the sub-configuration menu 2 in FIG. 14, EN100DK which is representative recycled paper is selected as a flexible medium type, and data about EN100DK, that is, a Young's modulus of 5409 Mpa, a density of $6.8 \times 10^{-7}$ kg/mm$^3$, and a thickness of 0.0951 mm, are selected from a database 128.

(Equal Segmentation)

When the "equal segmentation" button in a segmentation method selection window 2I in the sub-configuration menu 2 is operated, a model obtained by segmenting a straight line (broken line) 32 representing a flexible medium at equal intervals with mass points 33 and connecting the respective mass points with rotational springs 34 and translational springs 35 is displayed in the graphical window 3 as shown in FIG. 5 in the same manner as in the first embodiment.

Each rotational spring 34 connecting the mass points 33 represents flexural stiff when a flexible medium is regarded as an elastic body, whereas each translational spring 35 represents tensile stiffness. The spring constants of these two springs can be derived from the elastic theory.

In this embodiment, a rotational spring constant kr and a translational spring constant ks can be given by $$kr = \frac{Ewt^3}{12\Delta L}, \ ks = \frac{Ewt}{\Delta L} \quad (3)$$

$$\Delta L = \frac{\sqrt{(x_2 - x_1)^2 + (y_2 - y_1)^2}}{n}$$

where E is a Young's modulus, w is a width, t is a thickness, and $\Delta L$ is the distance between mass points.

A mass m at the mass point 33 is calculated by $m = Lwt\rho/(n-1)$ where L is the length of the flexible medium, w is the width, t is the thickness, $\rho$ is the density, and n is a segmentation count. The flexible medium conveyed on the convey path can be equally discretized into spring-mass elements, and defined, on this system, as a model of an elastic body (flexible medium model) that reacts to "flexural" and "tensile" forces.

(Unequal Segmentation)

A case wherein the "unequal segmentation" button in the segmentation method selection window 2I is selected in the sub-configuration menu 2 will be described next. In this embodiment, when the "unequal segmentation" button is operated, equal-ratio segmentation can be performed. Equal-ratio segmentation is performed by using a scheme of defining the mass point intervals at the end portions of a flexible medium such that the mass point interval at one end portion is set at a predetermined ratio to that at the other end portion, and changing mass point intervals between them at an equal ratio.

FIG. 14 is a view showing an example of the flexible medium model automatically displayed in the graphical window 3 when the flexible medium model creation module 202 is executed, the position of the flexible medium, a segmentation count, and a medium type are input, and the "unequal segmentation" button is operated in the design support system according to the second embodiment.

In the case shown in FIG. 14, definition is performed such that the segmentation count is 6, and a mass point interval L6 on the end portion A side is twice a mass point interval on the end portion B side. In this case, the user needs to input segmentation count n=6 and end portion interval ratio $\alpha$=2.0 through a command field 4.

When the user designates the end portion A on the graphical window 3, the flexible medium is modeled such that the mass point intervals are set at an equal ratio, as shown in FIG. 14.

In this embodiment, as in the first embodiment, mass points are connected with the rotational springs 34 and translational springs 35. However, the respective spring constants do not uniformly become the same value. More specifically, a rotational spring constant kr and translational spring constant ks are calculated by $$kr_i = \frac{Ewt^3}{6(\Delta L_i + \Delta L_{i-1})} \tag{4}$$

$$ks_i = \frac{2Ewt}{(\Delta L_i + \Delta L_{i-1})} \tag{5}$$

Letting L be the total length of a flexible medium, each mass point interval $\Delta L_i$ is calculated by equation (5) when the segmentation count is an even number, and by equation (6) when the segmentation count n is an odd number.

$$\Delta L_i = \left\{ 1 + \left( \frac{\alpha - 1}{\frac{n}{2} - 1} \right) i \right\} L \tag{5}$$

$$L_i = \left\{ 1 + \left( \frac{\alpha - 1}{\frac{n-1}{2} - 1} \right) i \right\} L \tag{6}$$

By performing unequal segmentation (equal-ratio segmentation) according to the above sequence, the operation of discretizing a flexible medium into a plurality of spring-mass systems can be easily implemented, and the number of steps required to create a model can be greatly decreased. In addition, a flexible medium can be discretized more finely than when a flexible medium is discretized at equal intervals, although the number of mass-spring elements remains the same. This makes it possible to obtain accurate calculation results of a frictional resistance, convey velocity, and the like at the time of contact of an end portion with a guide or roller, in particular, without imposing any heavy calculation load.

(Automatic Segmentation)

A case wherein the "automatic" button in the segmentation method selection window 2I is selected in the sub-configuration menu 2 will be described next. When the "automatic" button is selected, the execution of two modules (i.e., a problem content selection module and an automatic segmentation module) are started in the flexible medium model creation module 202.

Figure 15:
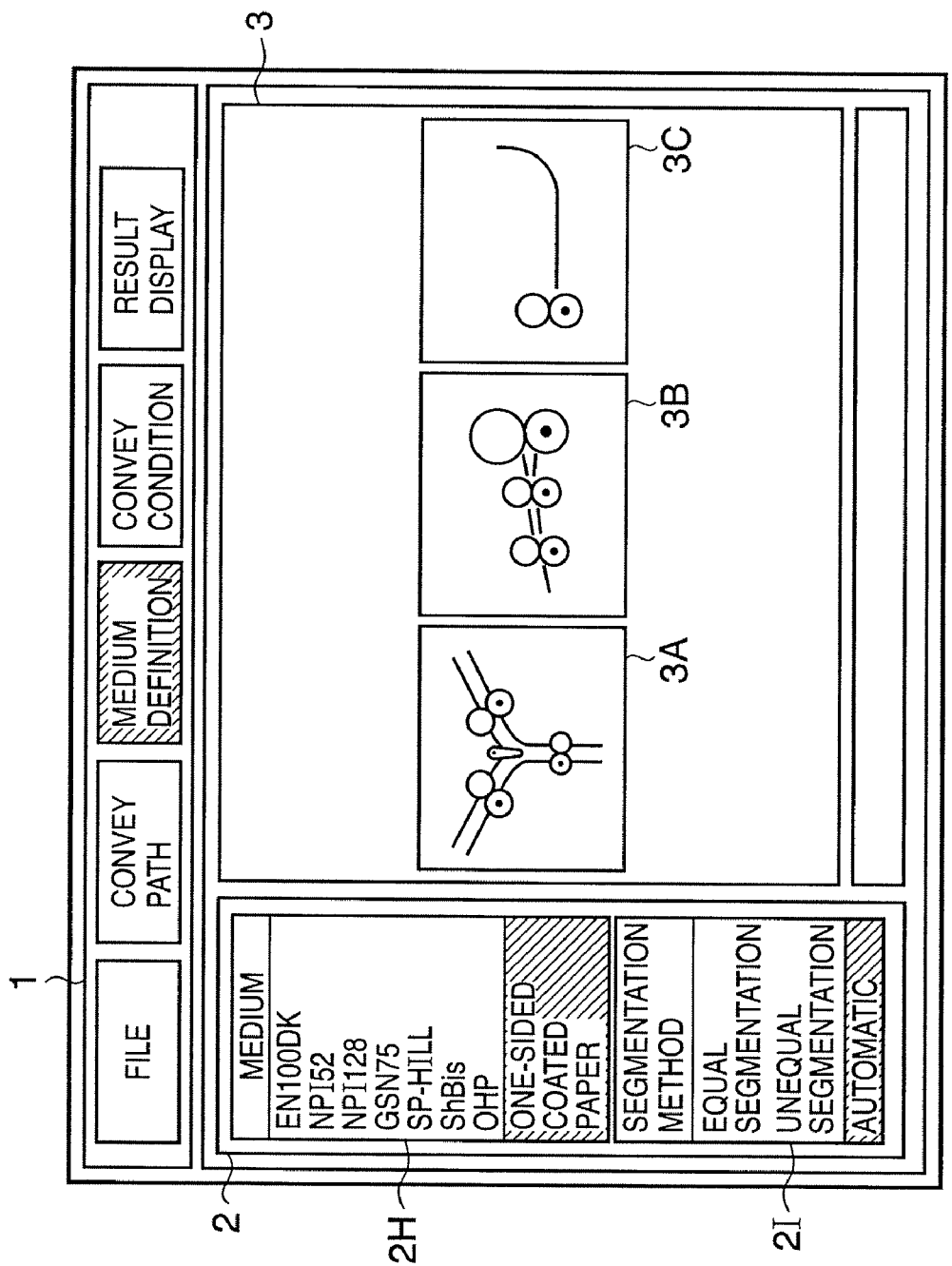
FIG. 15 is a view showing an example of schematic buttons corresponding to problem contents automatically displayed in a graphical window 3 when the flexible medium model creation module 202 is executed, the position of a flexible medium, a segmentation count, and a medium type are input, and the "automatic" button is operated in the design support system according to the second embodiment.

First of all, when the "automatic" button is selected in the segmentation method selection window 2I, the problem content selection module is executed to display three buttons, namely an inversion mechanism problem button 3A, image formation problem button 3B, and convey guide problem button 3C, in the graphical window 3, as indicated by the graphical window 3 shown in FIG. 15, as schematic buttons representing typical problem contents in a copying machine, printer, or the like.

FIG. 15 is a view showing an example of the schematic buttons representing problem contents which are automatically displayed in the graphical window 3 when the flexible medium model creation module 202 is executed, the position of a flexible medium, a segmentation count, and a medium type are input, and the "automatic" button is operated in the design support system according to the second embodiment.

Figure 16:
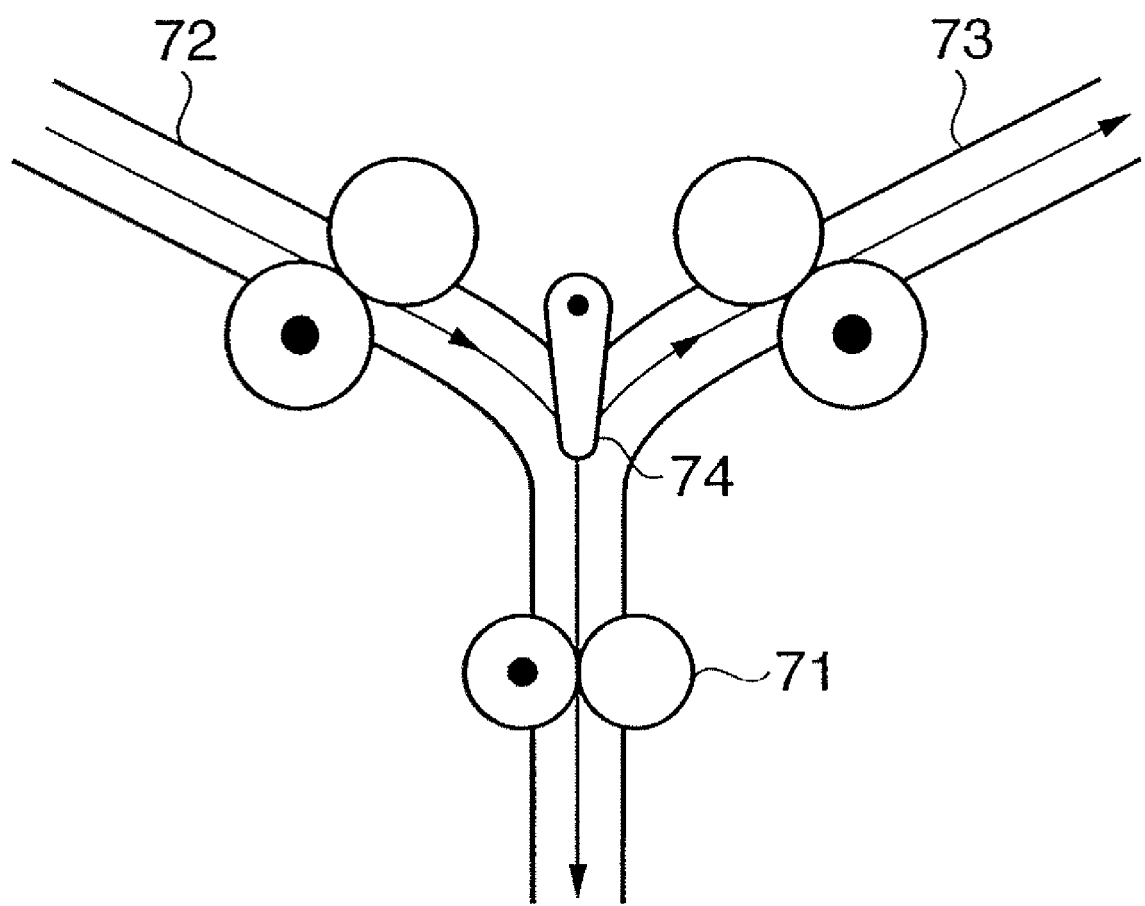
FIG. 16 is a view for explaining an inversion mechanism problem corresponding to an inversion mechanism problem button 3A.

The first inversion mechanism problem corresponding to the inversion mechanism problem button 3A is a problem associated with a switchback mechanism which inverts the convey direction of a flexible medium at a predetermined position and conveys the flexible medium to another path, as shown in FIG. 16. More specifically, this problem is associated with the evaluation of the frictional resistances between the two ends of a flexible medium and convey guides when the trailing end of the flexible medium conveyed from the convey guide 72 side passes through a flapper 74, the convey direction of the flexible medium is quickly inverted by inversion rollers 71 to convey the flexible medium to the convey guide 73 side.

Figure 17:
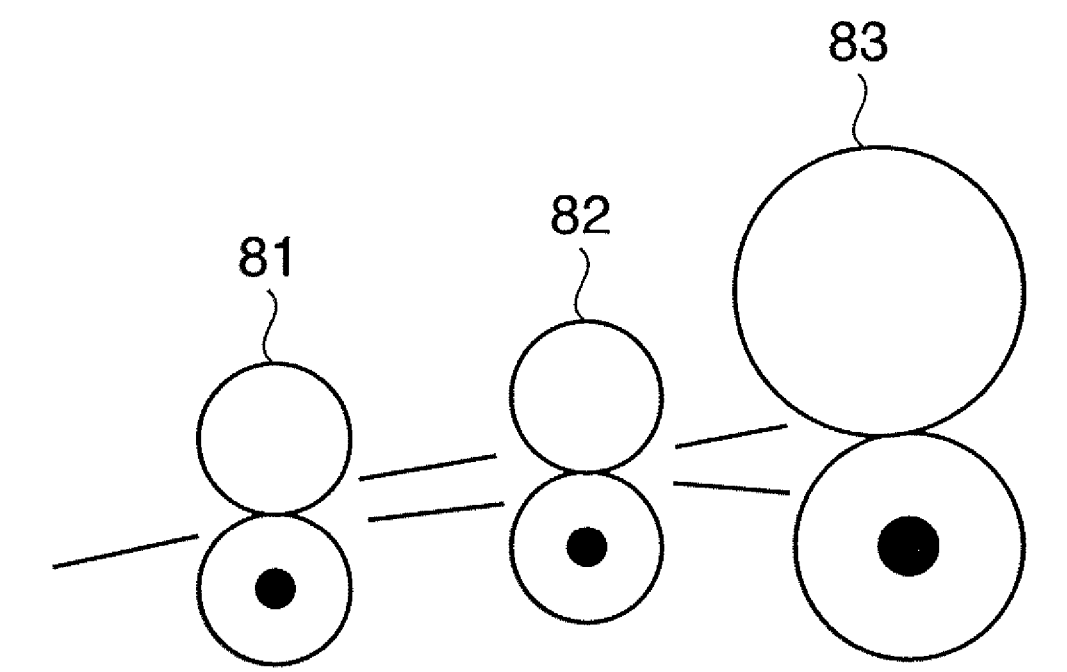
FIG. 17 is a view for explaining an image formation problem corresponding to an image formation problem button 3B.

The second image formation problem corresponding to the image formation problem button 3B is a problem associated with an image forming mechanism constituted by registration rollers 81 for a flexible medium (sheet), a transfer roller 82 which transfer toner or the like onto the flexible medium, and fixing rollers 83 which heat and fix the toner on the flexible medium, as shown in FIG. 17. Since the velocity variations of a flexible medium (sheet) at a position before the transfer roller 82 are very important for stable image formation, this problem is associated, in particular, with evaluating how the velocity variations of the flexible medium at the same position are influenced by the conveyed states of the flexible medium at the registration rollers 81 and fixing rollers 83.

Figure 18:
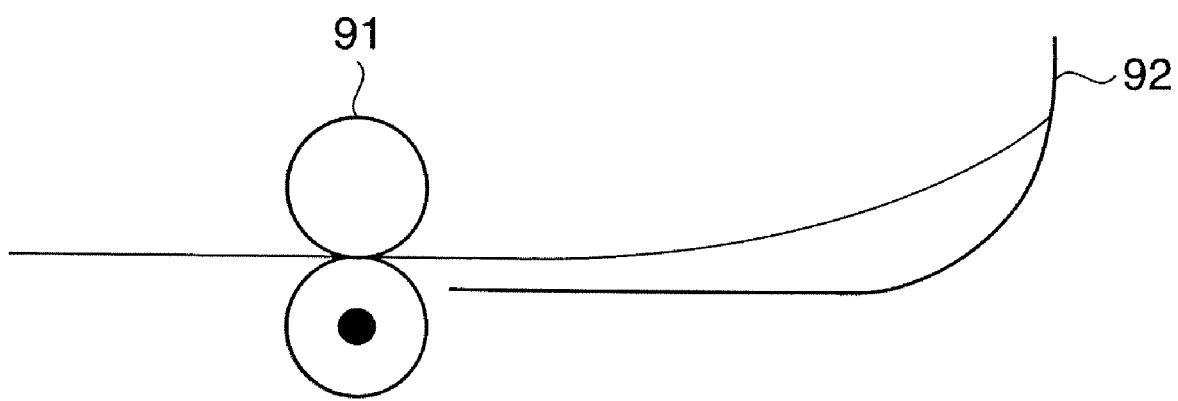
FIG. 18 is a view for explaining a convey guide problem corresponding to a convey guide problem button 3C.

The third convey guide problem corresponding to the convey guide problem button 3C is a problem associated with a simple mechanism constituted by convey rollers 91 and a convey guide 92, as shown in FIG. 18. More specifically, this problem is associated with the evaluation of a load imposed on the convey rollers 91 when the leading end of a flexible medium comes into contact with the convey guide 92.

In this embodiment, problem-solving methods and segmentation forms based on the problem-solving methods, including segmentation counts and the like for stiff body elements, with respect to these three problems are stored in the database 128 in advance in correspondence with the respective types of problem contents described above. The specific contents of them will be described below.

It is common to the respective problems described above that beneficial effects can be produced in segmentation for modeling in terms of calculation load and precision by minimizing the number of stiff body elements (spring-mass elements) and setting short element intervals at a portion where a large bending moment occurs.

When solving the inversion mechanism problem, it is preferable in the evaluation of the contact resistances between the two ends of a flexible medium and a convey guide in the inversion mechanism that fine discretization is made near the two end portions, and rough discretization is made at a middle portion.

When solving the image formation problem, it is preferable in the evaluation of velocity variations of a flexible medium in front of the transfer roller in the image forming mechanism that finer discretization is made at the middle portion than at the end portions.

When solving the convey guide problem, in the evaluation of the convey guide mechanism in which only the leading end of a flexible medium comes into contact with a convey guide, it is preferable that discretization become finer toward the leading end.

A method of increasing/decreasing the discretization level for the spring-mass elements of a flexible medium in accordance with the three problems to be solved can be implemented by applying modeling in the above case of "equal-ratio segmentation".

That is, for the inversion mechanism, it suffices to set the total length L in equations (5) and (6) to 0.5 L and replacing the definition of the end portion interval ratio $\alpha$ with the interval ratio between the middle portion and an end portion of the inversion mechanism.

For the image forming mechanism, it suffices to reverse the conditions for the inversion mechanism. For the contact mechanism between the leading end of a flexible medium and a guide, it suffices to use equations (5) and (6) without any change.

Additionally, determining in advance the appropriate values of the segmentation count n and interval ratio α as parameters for determining a discretization level for the spring-mass elements of a flexible medium by case studies and registering them in the database 128 will avoid any user interaction with segmentation. For example, FIG. 19 shows the appropriate segmentation counts n and interval ratios α for EN100 which is representative recycled paper and Springhill which is cardboard in the above problem contents.

<Convey Condition Setting Module 203>

After discretization into spring-mass elements by the flexible medium model creation module 202, the flow advances to the processing executed by the convey condition setting module 203.

The convey condition setting module 203 has substantially the same processing arrangement as that of the convey condition setting module 103 according to the first embodiment. The user selects a roller for which he/she wants to define drive conditions, with a pointing device or the like, from the convey rollers constituting the convey path which are displayed in the graphical window 3 by, for example, button operation in the sub-configuration menu 2 exemplified in FIG. 6. The user then can define drive control on the selected roller and frictional coefficients in the same manner as described with reference to FIGS. 7 and 8.

Although the convey path definition module 201, flexible medium model creation module 202, and convey condition setting module 203 described above independently function, the motion calculation module 204 and element re-segmentation module 205 alternately function.

Figure 20:
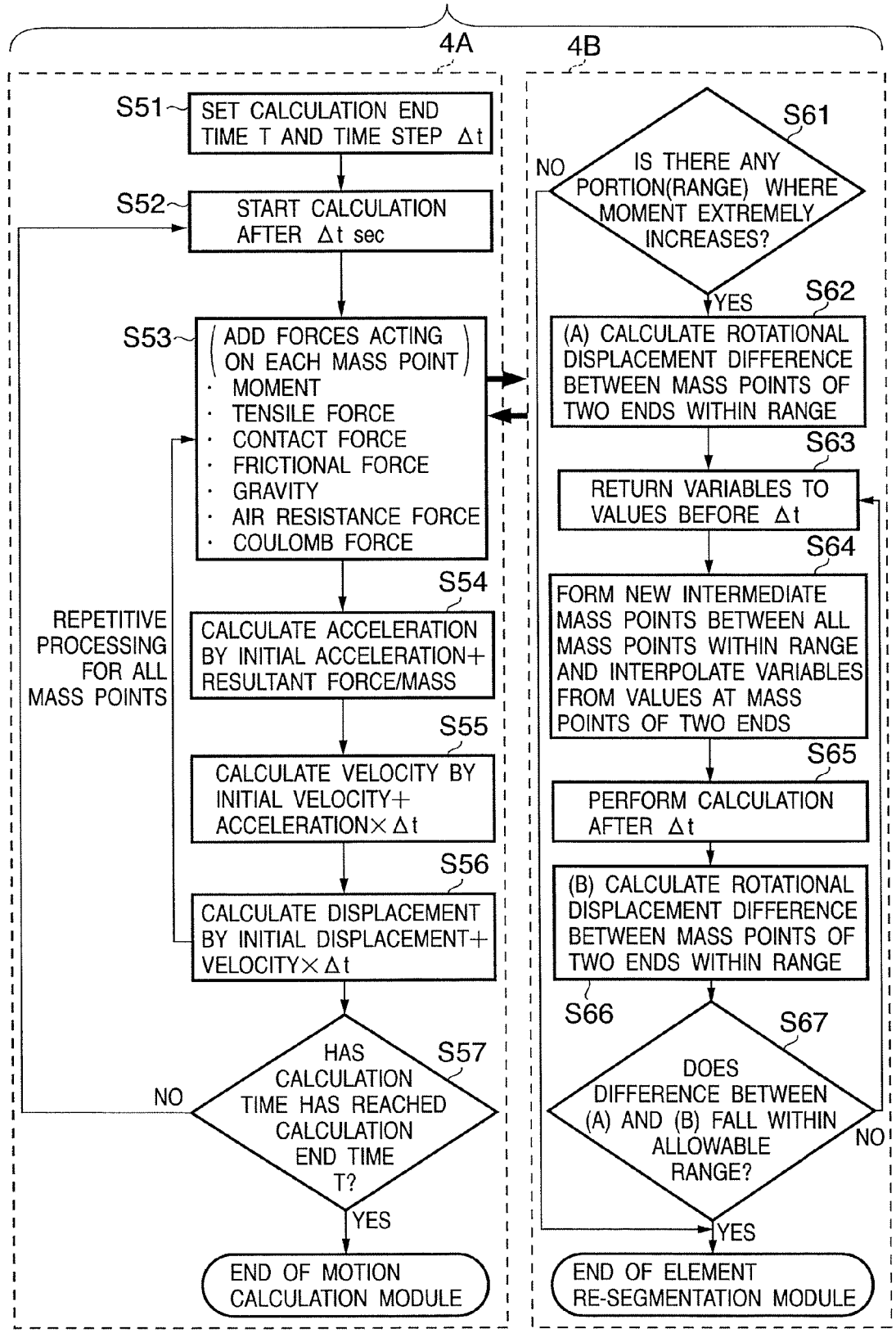
FIG. 20 is a flow chart showing the details of processing sequences in a motion calculation module 204 and element re-segmentation module 205.

FIG. 20 is a flow chart showing the details of processing sequences in the motion calculation module 204 and element re-segmentation module 205.

In steps S51 to S57, a motion calculation module 4A (204) obtains the behavior of the flexible medium conveyed in the convey path up to a real time T by solving the equation of motion in consideration of various kinds of forces acting on the flexible medium model in the same manner as in the sequence described with reference to the flow chart of FIG. 9 in the first embodiment.

A element re-segmentation module 4B (205) will be described next.

First of all, in step S61, it is checked by referring to the rotation moment at each mass point calculated in step S53 in the motion calculation module 4A (204) whether or not any large rotation moment is locally produced in a portion of the flexible medium. This check is made by letting L be the total length of the flexible medium, M be the total rotation moment acting on the flexible medium, $\Delta L_i$ be the mass point interval at a given mass point i, and Mi be the rotation moment; such that if the condition represented by inequality (7) is satisfied, it is determined that a large moment is locally produced, and the flow then advances to step S62. If this condition is not satisfied, the element re-segmentation module 4B (205) is terminated.

$$\sum_{i}^{i+n} \frac{\Delta L_i}{L} \sum_{i}^{i+n} \frac{M_i}{M} > 0.5 \quad (7)$$

The right side of inequality is the product of the term obtained by dividing the continuous distance between n mass points by the total length L of the flexible medium and the term obtained by dividing the sum total of rotation moments at the same mass points by the total rotation moment M. If this value exceeds 0.5, it is determined that a large moment is locally produced. Although n generally takes a value between 5 to 10, assume that in this embodiment, n=5.

Since it is determined in step S62 that a large moment is produced in the portion where it is determined in step S61 that the condition represented by inequality (7) is satisfied, a rotational angle θ of the two ends between the mass point i and the mass point (i+5) in FIG. 21 is calculated and stored.

In step S63, the acceleration, velocity, and displacement which are information about each mass point are returned to the values before Δt.

Figure 22:
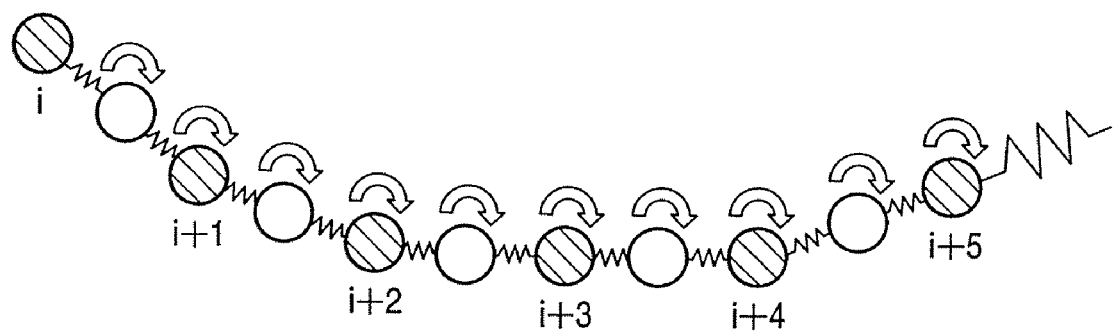
FIG. 22 is a view for explaining step S64 in the element re-segmentation module 4B (205)

In step S64, new mass points are provided between the mass point i and the mass point (i+5), as indicated by the outlined circles in FIG. 22, and the range extracted in step S61 is re-segmented. At the same time, since the mass point interval changes, the mass of each mass point, the rotational spring constant, and translational spring constant are reduced to ½. As a physical quantity j concerning each new mass point required to calculate the equation of motion, the average value of the mass points at the two ends is used.

In step S65, motion calculation after Δt sec is performed by time integration using a model of the flexible medium re-segmented in step S64.

In step S66, the rotational angle θ of the two ends between the mass point i and the mass point (i+5) is calculated and stored as in step S62.

In step S67, a different θd between the rotational angles obtained in steps S62 and S66 is obtained, and it is checked whether the difference θd is equal to or less than a predetermined allowable value (e.g., 10°), this element re-segmentation module is terminated. If the difference θd is larger than the allowable value (e.g., 10°), the flow returns to step S64 to perform re-segmentation.

<Result Display Module 206>

The result display module 206 has a processing apparatus similar to that of the result display module 105 according to the first embodiment. When the user selects the "moving image display" menu in the sub-configuration menu 2, a moving image representing the behavior of the flexible medium exemplified in FIG. 11 is displayed in the graphical window 3. The user can adjust the display by operating the playback button, stop button, pause button, fast forward button, and rewind button in the menu. If the user selects "plot display" menu, a graph representing changes in parameters (acceleration, velocity, displacement, and the like) selected from the "plot display" menu as a function of time with respect to a guide or roller selected as a target (analysis target) by the user is displayed in the graphical window 3, as exemplified in FIG. 12.

OTHER EMBODIMENT

The present invention described exemplifying the respective embodiments can be applied to a system constituted by a plurality of devices, or to an apparatus comprising a single device.

The present invention incorporates a case wherein programs of software for implementing the functions of the respective modules described in the respective embodiments described above are directly or remotely supplied to a system or apparatus serving as the above design support system to cause the computer of the system or apparatus to read out and execute the programs. In this case, each embodiment need not take the form of a program as long as it has the function of the program.

The program codes themselves which are installed in the computer to allow the computer to implement the functions/processing of the present invention also realize the present invention. That is, the computer programs themselves, which implement the functions/processing of the present invention, are also incorporated in the present invention.

In this case, the program may take any form (e.g., an object code, a program executed by an interpreter, and script data supplied to an OS) as long as it has the function of the program.

As a recording medium for supplying the program, a flexible disk, a hard disk, optical disk, magneto-optical disk, MO, CD-ROM, CD-R, CD-RW, magnetic tape, nonvolatile memory card, ROM, DVD (DVD-ROM or DVD-R), or the like can be used.

In addition to the above, methods of supplying the programs include the following. A client computer connects to a home page on the Internet by using a browser to download each computer program of the present invention itself from the home page or download a compressed file containing an automatic install function into a recording medium such as a hard disk. Alternatively, the programs can be supplied by dividing the program codes constituting each program of the present invention into a plurality of files, and downloading the respective files from different home pages. That is, the present invention also incorporates a WWW (World Wide Web) server which allows a plurality of users to download program files for causing the computer to execute the functions/processing of the present invention.

Additionally, the functions/processing of the present invention can be implemented by encrypting the programs of the present invention, storing the encrypted data in storage media such as CD-ROMs, distributing them to users, allowing users who satisfy a predetermined condition to download key information for decryption from a home page through the Internet, executing the encrypted programs using the key information, and allowing a computer to install the programs.

The functions of the above embodiment are implemented not only when the readout programs are executed by the computer but also when the OS running on the computer performs part or all of actual processing on the basis of the instructions of the programs.

The functions of the above embodiment are also implemented when the programs read out from the storage medium are written in the memory of a function expansion board inserted into the computer or a function expansion unit connected to the computer, and the CPU of the function expansion board or function expansion unit performs part or all of actual processing on the basis of the instructions of the programs.

According to the present invention, a design support system can be provided, which accurately simulates the behavior of a flexible medium in a convey path even if the flexible medium exhibits different flexural stiffness in different bending directions.

The present invention is not limited to the above embodiments and various changes and modifications can be made within the spirit and scope of the present invention. Therefore, to apprise the public of the scope of the present invention, the following claims are made.

What is claimed is:

1. A simulation apparatus for simulating a behavior of a flexible medium conveyed in a convey path constituted by mechanical components, comprising:

a convey path setting unit configured to set a mechanical component model constituting the convey path based on a kind of information of the mechanical component and attribute information of the mechanical component which are inputted by an input device;

a flexible model setting unit configured to set a flexible medium model corresponding to the flexible medium, and to set a position and a direction of an obverse surface of the flexible model, according to input from the input device, wherein one surface on the flexible medium is composed of a coated layer or toner layer, and the flexible medium model exhibits different stiffnesses against flexural deformation in different bending directions;

a unit configured to simulate the behavior of the flexible medium conveyed in the convey path based on the mechanical component model and the flexible medium model by using a processing unit in the simulation apparatus; and a display control unit configured to control a display device to display an image indicating the simulated behavior of the flexible medium, wherein the position and direction of the obverse surface of the flexible model is shown in the image.

2. The simulation apparatus according to claim 1, wherein the flexible medium model is expressed by using a plurality of stiff body elements each having mass and one pair of rotational and translational springs which connect each adjacent pair of stiff body elements and wherein a spring coefficient of the rotational spring is determined based on a bending direction of the flexible medium model and the information associated with the coated layer or toner layer.

3. The simulation apparatus according to claim 2, wherein a smaller spring coefficient of the rotational spring is determined when the coated layer or toner layer of the flexible medium model is bent toward a valley side than when bent toward a peak side.

4. The simulation apparatus according to claim 1, wherein the one of the surfaces of the flexible medium model are distinguishably displayed by a marker added to the flexible medium model displayed in the image indicating the simulated behavior of the flexible medium.

5. A simulation method of simulating a behavior of a flexible medium conveyed in a convey path constituted by mechanical components when executed in a simulation apparatus, comprising:

a convey path setting step of setting a mechanical component model constituting the convey path based on a kind information of the mechanical component and attribute information of the mechanical component which are inputted by an input device;

a flexible model setting step of setting a flexible medium model corresponding to the flexible medium, and to set a position and a direction of an obverse surface of the flexible model, according to input from the input device, wherein one surface on the flexible medium is composed of a coated layer or toner layer, and the flexible medium model exhibits different stiffnesses against flexural deformation in different bending directions;

a step of simulating the behavior of the flexible medium conveyed in the convey path based on the mechanical component model and the flexible medium model by using a processing unit in the simulation apparatus; and a display control step of controlling a display device to display an image indicating the simulated behavior of the flexible medium, wherein the position and the direction of the obverse surface of the flexible model is shown in the image.

6. The simulation method according to claim 5, wherein the flexible medium model is expressed by using a plurality of stiff body elements each having mass and one pair of rotational and translational springs which connect each adjacent pair of stiff body elements and wherein a spring coefficient of the rotational spring is determined based on a bending direction of the flexible medium model and the information associated with the coated layer or toner layer.

7. The simulation method according to claim 6, wherein a smaller spring coefficient of the rotational spring is determined when the coated layer or toner layer of the flexible medium model is bent toward a valley side than when bent toward a peak side.

8. The simulation method according to claim 5, wherein the one of the surfaces of the flexible medium are distinguishably displayed by a marker added to the flexible medium model displayed in the image indicating the simulated behavior of the flexible medium at the display control step.

9. A program stored in computer readable storage medium for making a computer implement a simulation method of simulating a behavior of a flexible medium conveyed in a convey path constituted by mechanical components, the simulation method comprising:
  a convey path setting step of setting a mechanical component model constituting of the convey path based on a kind of information of the mechanical component and attribute information of the mechanical component which are inputted by an input device;
  a flexible model setting step of setting a flexible medium model corresponding to the flexible medium, and to set a position and a direction of an obverse surface of the flexible model, according to input from the input surface, wherein one surface on the flexible medium is composed of a coated layer or toner layer, and the flexible medium model exhibits different stiffnesses against flexural deformation in different bending directions;
  a step of simulating the behavior of the flexible medium conveyed in the convey path based on the mechanical component model and the flexible medium model by using a processing unit in the simulation apparatus; and
  a display control step of controlling a display device to display an image indicating the simulated behavior of the flexible medium, wherein the position and the direction of the obverse surface of the flexible model is shown in the image.

10. The program according to claim 9, wherein the flexible medium model is expressed by using a plurality of stiff body elements each having mass and one pair of rotational and translational springs which connect each adjacent pair of stiff body elements and wherein a spring coefficient of the rotational spring is determined based on a bending direction of the flexible medium and the information associated with the coated layer of toner layer.

11. The program according to claim 10, wherein a smaller spring coefficient of the rotational spring is determined when the coated layer or toner layer of the flexible medium model is bent toward a valley side than when bent toward a peak side.

12. The program according to claim 9, wherein the one of the surfaces of the flexible medium are distinguishably displayed by a marker added to the flexible medium model displayed in the image indicating the simulated behavior of the flexible medium at the display control step.

* * * * *